United States Patent
Sasaki et al.

(10) Patent No.: US 10,094,972 B2
(45) Date of Patent: Oct. 9, 2018

(54) MULTICORE FIBER

(71) Applicants: FUJIKURA LTD., Tokyo (JP); NATIONAL UNIVERSITY CORPORATION HOKKAIDO UNIVERSITY, Sapporo-shi, Hokkaido (JP)

(72) Inventors: Yusuke Sasaki, Sakura (JP); Hitoshi Uemura, Sakura (JP); Kunimasa Saitoh, Sapporo (JP); Takeshi Fujisawa, Sapporo (JP)

(73) Assignees: FUJIKURA LTD., Tokyo (JP); NATIONAL UNIVERSITY CORPORATION HOKKAIDO UNIVERSITY, Hokkaido (JP)

( * ) Notice: Subject to any disclaimer, the term of this patent is extended or adjusted under 35 U.S.C. 154(b) by 0 days.

(21) Appl. No.: 15/424,087

(22) Filed: Feb. 3, 2017

(65) Prior Publication Data

US 2017/0248754 A1    Aug. 31, 2017

(30) Foreign Application Priority Data

Feb. 29, 2016    (JP) .................. 2016-037811

(51) Int. Cl.
    *G02B 6/036*    (2006.01)
    *G02B 6/26*    (2006.01)
    (Continued)

(52) U.S. Cl.
    CPC ........... *G02B 6/02* (2013.01); *G02B 6/02042* (2013.01); *G02B 6/02023* (2013.01)

(58) Field of Classification Search
    CPC ............ G02B 6/02042; G02B 6/02023; C03B 2203/34
    (Continued)

(56) References Cited

U.S. PATENT DOCUMENTS

| 6,327,403 B1 * | 12/2001 | Danziger | ........... G02B 6/03644 385/126 |
| 6,434,311 B1 * | 8/2002 | Danziger | ........... G02B 6/02023 385/123 |

(Continued)

FOREIGN PATENT DOCUMENTS

| JP | 10-242548 A | 9/1998 |
| JP | 2001-033638 A | 2/2001 |

(Continued)

OTHER PUBLICATIONS

"Multicore fiber-based mode multiplexer-demultiplexer" by Sasaki et al, Proceedings of SPIE, vol. 9389, Feb. 7, 2015.*

(Continued)

*Primary Examiner* — Robert Tavlykaev
(74) *Attorney, Agent, or Firm* — Westerman, Hattori, Daniels & Adrian, LLP

(57) ABSTRACT

A multicore fiber includes: a center core that propagates four LP mode light beams including an $LP_{02}$ mode light beam; and a first to a fifth cores disposed on a first line to a fifth line segments extend from the center of the center core in the radial direction at predetermined angles. The multicore fiber includes a different mode interaction section in which the propagation constants of each mode light beam propagated through the center core are matched with the propagation constants of $LP_{01}$ mode light beams propagated through the first to fifth cores.

10 Claims, 13 Drawing Sheets

(51) Int. Cl.
*G02B 6/42* (2006.01)
*G02B 6/02* (2006.01)

(58) Field of Classification Search
USPC .................................. 385/28, 30, 123, 126
See application file for complete search history.

(56) References Cited

U.S. PATENT DOCUMENTS

| | | | | |
|---|---|---|---|---|
| 6,535,678 | B1* | 3/2003 | Yamauchi | G02B 6/02019 385/123 |
| 8,509,581 | B2* | 8/2013 | Winzer | G02B 6/03611 385/122 |
| 9,442,246 | B2* | 9/2016 | Brunet | G02B 6/03611 |
| 9,470,841 | B2* | 10/2016 | Bickham | G02B 6/02042 |
| 2005/0013572 | A1* | 1/2005 | Guan | G02B 6/02261 385/127 |
| 2006/0257071 | A1 | 11/2006 | Bise et al. | |
| 2013/0230281 | A1 | 9/2013 | Bowen | |
| 2014/0064687 | A1* | 3/2014 | Hoover | G02B 6/03644 385/126 |
| 2014/0093205 | A1* | 4/2014 | Gruner-Nielsen | G02B 6/0288 385/43 |
| 2014/0153883 | A1* | 6/2014 | Mukasa | G02B 6/02042 385/100 |
| 2015/0086157 | A1* | 3/2015 | Fontaine | G02B 6/14 385/28 |
| 2015/0160408 | A1* | 6/2015 | Bickham | G02B 6/02042 385/124 |
| 2016/0187577 | A1 | 6/2016 | Sasaki et al. | |

FOREIGN PATENT DOCUMENTS

| | | |
|---|---|---|
| JP | 2006-317948 A | 11/2006 |
| JP | 2011-215394 A | 10/2011 |
| WO | 2015/129775 A1 | 9/2015 |

OTHER PUBLICATIONS

"Few-core spatial-mode multiplexers/demultiplexers based on evanescent coupling" by Riesen et al, IEEE Photonics Technology Letters, vol. 25, No. 14, pp. 1324-1327, 2013.*

"Mode multiplexer/demultiplexer based on a partially elongated multi-core fiber" by Uemura et al, paper Tu3D.3 OFC 2014.*

Nishimoto, Shoko et al., "Design of 5 mode multi/demultiplexer based on fused type multicore fiber coupler", The Institute of Electronics, Information and Communication Enigineers, Feb. 11, 2016, vol. 115, No. 452. pp. 95-100. cited in Japanese Office Action dated Sep. 5, 2017 (7 pages).

Huang, Bin et al., "All-fiber mode-group-selective photonic lantern using graded-index multimode fibers", Optics Express, OSA Publishing, Jan. 6, 2015, vol. 23, No. 1, pp. 224-234. cited in Japanese Office Action dated Sep. 5, 2017 ((11 pages).

Office Action dated Sep. 5, 2017, issued in counterpart Japanese application No. 2016-037811, with English translation (8 pages).

* cited by examiner

MULTICORE FIBER

BACKGROUND OF THE INVENTION

The present invention relates to a multicore fiber that is preferable to the case of multiplexing and demultiplexing light beams in different modes.

In optical communications using optical fibers, multimode communications are known, in which information is superposed on a light beam in the $LP_{01}$ mode (the fundamental mode) as well as information is superposed on light beams in LP modes higher than the fundamental mode, such as the $LP_{11}$ mode for information communications. In multimode communications, a plurality of LP mode light beams propagated through one core is demultiplexed to a plurality of optical fibers, or LP mode light beams different from each other, which are propagated through a plurality of optical fibers, are multiplexed on one optical fiber.

Patent Literature 1 below describes a multicore fiber that can demultiplex a plurality of LP mode light beams propagated through one core to a plurality of cores or can multiplex light beams propagated through a plurality of cores on one core as LP mode light beams different from each other. The multicore fiber of Patent Literature 1 below includes a core disposed in the center of a cladding and cores disposed around the core. This multicore fiber can demultiplex a plurality of LP mode light beams propagated through the center core to a plurality of other cores disposed around the center core or can multiplex a light beam propagated through the plurality of cores on the center core as LP mode light beams different from each other. In order to allow mode-multiplexing and mode-demultiplexing as described above, in the multicore fiber, the plurality of cores is disposed being matched with the field shapes of the mode light beams.

[Patent Literature 1] WO/2015/129775 A

SUMMARY OF THE INVENTION

However, in the multicore fiber described in Patent Literature 1, the multiplexing and demultiplexing of the $LP_{02}$ mode light beam is insufficiently investigated.

Therefore, an object of the present invention is to provide a multicore fiber that can mode-multiplex and mode-demultiplex the $LP_{02}$ mode light beam.

To solve the problem, a multicore fiber of the present invention includes: a center core configured to propagate an $LP_{02}$ mode light beam, an $LP_{11}$ mode light beam, an $LP_{21}$ mode light beam, and an $LP_{02}$ mode light beam; a first core disposed at a position overlapped with a first line segment extending from a center of the center core in a radial direction; a second core disposed at a position overlapped with a second line segment extending from the center of the center core in a radial direction at an angle of 90 degrees to the first line segment; a third core disposed at a position overlapped with a third line segment extending from the center of the center core in a radial direction at an angle of 67.5 degrees to the first line segment and at an angle of 157.5 degrees to the second line segment; a fourth core disposed at a position overlapped with a fourth line segment extending from the center of the center core in a radial direction at an angle of 67.5 degrees to the second line segment and at an angle of 135 degrees to the third line segment; and a fifth core disposed at a position overlapped with a fifth line segment extending from the center of the center core in a radial direction at an angle of 67.5 degrees to the third line segment and at an angle of 67.5 degrees to the fourth line segment, wherein a different mode interaction section and a different mode non-interaction section are provided along a longitudinal direction, in the different mode interaction section, a propagation constant of the $LP_{11}$ mode light beam propagated through the center core is matched with propagation constants of $LP_{01}$ mode light beams propagated through the first core and the second core, a propagation constant of an $LP_{21}$ mode light beam propagated through the first core is matched with propagation constants of $LP_{01}$ mode light beams propagated through the third core and the fourth core, and a propagation constant of an $LP_{02}$ mode light beam propagated through the first core is matched with a propagation constant of an $LP_{01}$ mode light beam propagated through the fifth core, and in the different mode non-interaction section, propagation constants of the LP mode light beams propagated through the center core are not matched with propagation constants of LP mode light beams propagated through the first core, the second core, the third core, the fourth core, and the fifth core.

In this multicore fiber, the first core and the second core are disposed at the positions overlapped with the first line segment and the second line segment forming an angle of 90 degrees in the center of the center core. In the different mode interaction section, the propagation constant of the $LP_{11}$ mode light beam propagated through the center core is matched with the propagation constants of the $LP_{01}$ mode light beams propagated through the first core and the second core. Here, the $LP_{11}$ mode light beam is formed of light beams in two different modes ($LP_{11}a$ mode and $LP_{11}b$ mode light beams) in the relationship in which the sites having the strongest intensity are rotated at an angle of 90 degrees. The first core and the second core are disposed in the positional relationship. Thus, in the different mode interaction section, the $LP_{11}a$ mode light beam propagated through the center core can be mode-demultiplexed as one of the $LP_{01}$ mode light beams propagated through the first core and the second core, as well as the $LP_{11}b$ mode light beam propagated through the center core can be mode-demultiplexed as the other of the $LP_{01}$ mode light beams propagated through the first core and the second core. In the different mode interaction section, one of the $LP_{01}$ mode light beams propagated through the first core and the second core can be mode-multiplexed as the $LP_{11}a$ mode light beam propagated through the center core, as well as the other of the $LP_{01}$ mode light beams propagated through the first core and the second core can be mode-multiplexed as the $LP_{11}b$ mode light beam propagated through the center core.

In the multicore fiber, the third core and the fourth core are disposed at the positions overlapped with the third line segment and the fourth line segment forming an angle of 135 degrees in the center of the center core. In the different mode interaction section, the propagation constant of the $LP_{21}$ mode light beam propagated through the center core is matched with the propagation constants of the $LP_{01}$ mode light beams propagated though the third core and the fourth core. Here, the $LP_{21}$ mode light beam is formed of light beams in two different modes ($LP_{21}a$ mode and $LP_{21}b$ mode light beams) including four nodes in the relationship in which the sites having the strongest intensity are rotated at an angle of 45 degrees+an angle of 90 degrees×n (n is an integer in a range of zero to three). The third core and the fourth core are disposed in the positional relationship. Thus, in the different mode interaction section, the $LP_{21}a$ mode light beam propagated through the center core can be mode-demultiplexed as one of the $LP_{01}$ mode light beams propagated through the third core and the fourth core, as well as the $LP_{21}b$ mode light beam propagated through the center core can be mode-demultiplexed as the other of the $LP_{01}$ mode light beams propagated through the third core and the fourth core. In the different mode interaction section, one of the $LP_{01}$ mode light beams propagated through the third core and the fourth core can be mode-multiplexed as the $LP_{21}a$ mode light beam propagated through the center core, as well as the other of the $LP_{01}$ mode light beams propagated through the third core and the fourth core can be mode-multiplexed as the $LP_{21}b$ mode light beam propagated through the center core.

The multicore fiber includes the fifth core. In the different mode interaction section, the propagation constant of the $LP_{01}$ mode light beam propagated through the fifth core is matched with the propagation constant of the $LP_{02}$ mode light beam propagated through the center core. Thus, the $LP_{02}$ mode light beam propagated through the center core can be mode-demultiplexed as the $LP_{01}$ mode light beam propagated through the fifth core, as well as the $LP_{01}$ mode light beam propagated through the fifth core can be mode-multiplexed as the $LP_{02}$ mode light beam propagated through the center core. Note that, the $LP_{02}$ mode is an even mode. From the viewpoint of multiplexing and demultiplexing the $LP_{02}$ mode light beam, the fifth core only has to be disposed around the center core. The direction in which the fifth core is provided when viewed from the center core is not specifically limited.

In the multicore fiber, an angle formed by the first line segment and the second line segment is an angle of 90 degrees. An angle formed by the third line segment and the fourth line segment is an angle of 135 degrees. An angle formed by the first line segment and the third line segment is an angle of 67.5 degrees. An angle formed by the second line segment and the fourth line segment is an angle of 67.5 degrees. An angle formed by the third line segment and the fifth line segment is an angle of 67.5 degrees. An angle formed by the fourth line segment and the fifth line segment is an angle of 67.5 degrees. The first to the fifth cores are disposed being overlapped with these line segments. Thus, the first to the fifth cores are disposed apart from each other in a range in which mode-multiplexing and mode-demultiplexing is feasible as described above. The first to the fifth cores are disposed apart from each other in this manner. Accordingly, unintentional inter-core crosstalk caused by the light beams propagated through the cores is easily reduced.

Preferably, in the multicore fiber, an Expression (1) below is held, $$g_1, g_2 < g_3, g_4 < g_5 \qquad (1)$$

where a distance from the center of the center core to a center of the first core is defined as $g_1$, a distance from the center of the center core to a center of the second core is defined as $g_2$, a distance from the center of the center core to a center of the third core is defined as $g_3$, a distance from the center of the center core to a center of the fourth core is defined as $g_4$, and a distance from the center of the center core to a center of the fifth core is defined as $g_5$.

The present inventors found that the distances from the center core to the other cores satisfy the conditions in Expression (1) and hence the mode selection ratio is improved in the different mode interaction section in the case in which light beams in the C-band are propagated. Here, the term "mode selection ratio" means the ratio of the power of the multiplexed light beam emitted from the center core to the power of the light beam entered to any one of the first to the fifth cores. For example, the mode selection ratio of the $LP_{11}$ mode means the ratio of the power of the $LP_{11}$ mode light beam emitted from the center core to the power of the $LP_{01}$ mode light beam entered to the first core or the second core. Mode-multiplexing is more efficiently performed, as the mode selection ratio is higher.

Preferably, in the different mode non-interaction section, a distance from the center core to the first core, a distance from the center core to the second core, a distance from the center core to the third core, a distance from the center core to the fourth core, and a distance from the center core to the fifth core are 19 µm or more and 24 µm or less.

In the multicore fiber, an Expression (2) below may be held, $$\Delta_c \geq \Delta_1, \Delta_2 > \Delta_3, \Delta_4 > \Delta_5 \qquad (2)$$

where a relative refractive index difference of the center core to a cladding is defined as $\Delta_c$, a relative refractive index difference of the first core to the cladding is defined as $\Delta_1$, a relative refractive index difference of the second core to the cladding is defined as $\Delta_2$, a relative refractive index difference of the third core to the cladding is defined as $\Delta_3$, a relative refractive index difference of the fourth core to the cladding is defined as $\Delta_4$, and a relative refractive index difference of the fifth core to the cladding is defined as $\Delta_5$.

In the multicore fiber, an Expression (3) below may be held, $$r_c > r_1, r_2 > r_3, r_4 > r_5 \qquad (3)$$

where a radius of the center core is defined as $r_c$, a radius of the first core is defined as $r_1$, a radius of the second core is defined as $r_2$, a radius of the third core is defined as $r_3$, a radius of the fourth core is defined as $r_4$, and a radius of the fifth core is defined as $r_5$.

Preferably, the different mode interaction section is formed by stretching a part of the different mode non-interaction section.

The different mode interaction section is formed in this manner. Thus, the structure of the multicore fiber in a cross section in the different mode interaction section and the structure of the multicore fiber in a cross section in the different mode non-interaction section are in similar relationships. Consequently, the correlation between the propagation constant of the light beam in the different mode interaction section and the propagation constant of the light beam in the different mode non-interaction section is easily calculated. The different mode interaction section is formed by stretching. Accordingly, the different mode interaction section can be formed by easily stretching the multicore fiber using a heater having a small energy, such as a fusion splicer.

In the multicore fiber, the center core may be located in a center of the cladding.

As described above, according to the present invention, a multicore fiber that can mode-multiplex and mode-demultiplex the $LP_{02}$ mode light beam can be provided.

DETAILED DESCRIPTION OF THE INVENTION

Figure 1:
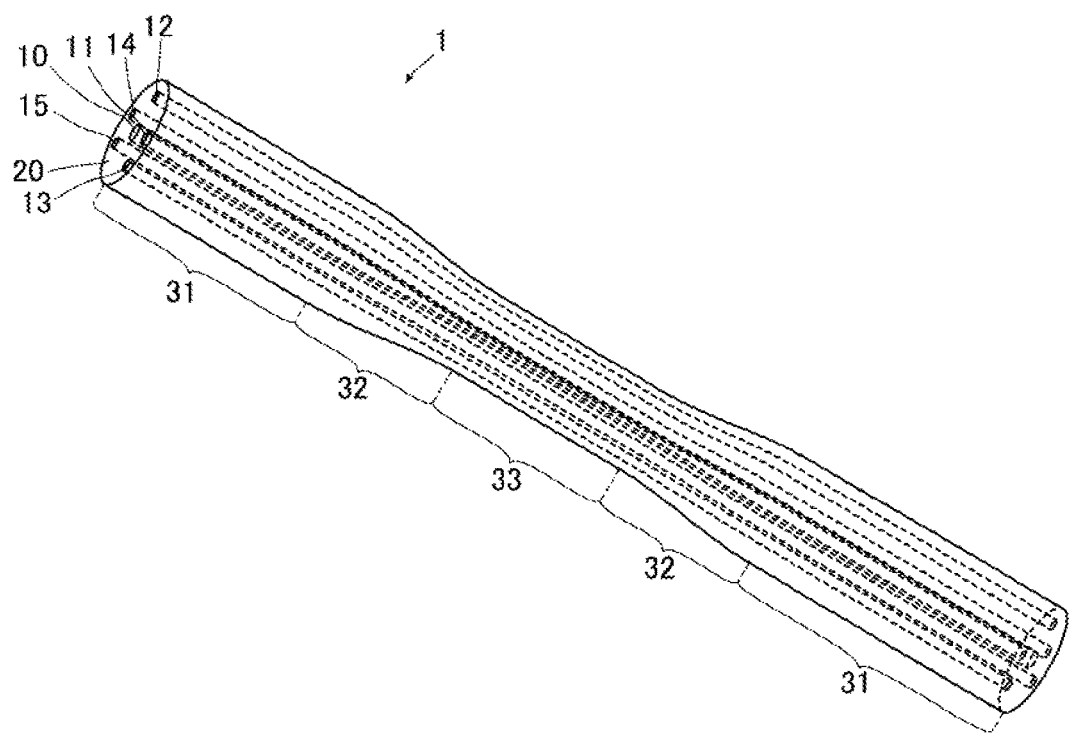
FIG. 1 is a diagram of a multicore fiber according to an embodiment.

In the following, a preferred embodiment of a multicore fiber according to the present invention will be described in detail with reference to the drawings. Note that, for easy understanding, scales described in the drawings are sometimes different from scales in the following description.

FIG. 1 is a perspective view of a multicore fiber according to an embodiment. As illustrated in FIG. 1, a multicore fiber 1 according to the embodiment includes a center core 10, a first core 11, a second core 12, a third core 13, a fourth core 14, and a fifth core 15, which are disposed around the center core 10, and a cladding 20 surrounding these cores.

The multicore fiber 1 is formed with a large-diameter portion 31, a tapered portion 32, and a small-diameter portion 33 along the longitudinal direction. The tapered portion 32 and the small-diameter portion 33 are formed by heating and stretching a part of the large-diameter portion 31. Stretching by such heating may be heating using an oxyhydrogen burner. However, this stretching can be sufficiently performed by heating caused by electric discharge. For example, a fusion splicer for optical fibers using arc discharge is practically available. Alternatively, this arc discharge may be used as a heat source for stretching. A fiber is stretched by heating using arc discharge in a closed space, easily allowing the fiber to be constantly molten. With the use of a stretching function having a combination of the motor of the fusion splicer and image analysis in stretching the fiber, allowing the multicore fiber 1 to be highly accurately stretched.

Figure 2:
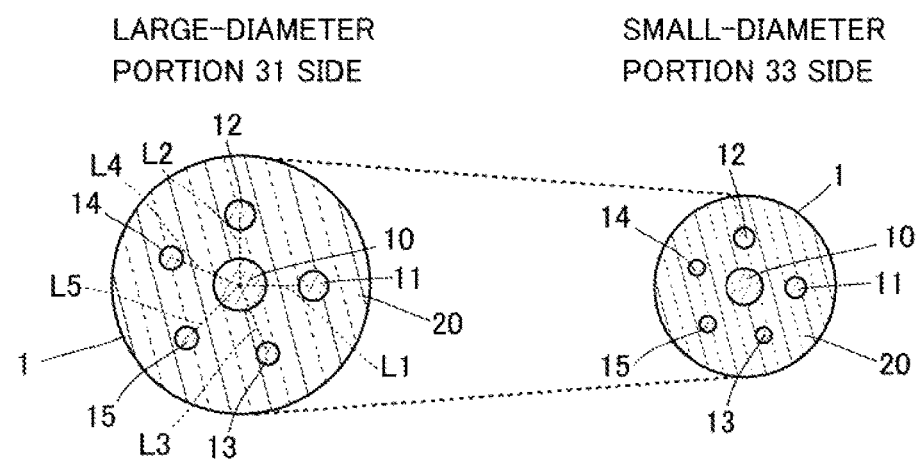
FIG. 2 is a diagram of cross sections perpendicular to the longitudinal direction in a large-diameter portion and a small-diameter portion of the multicore fiber in FIG. 1.

FIG. 2 is a diagram of the large-diameter portion 31 and the small-diameter portion 33 of the multicore fiber 1 in cross sections perpendicular to the longitudinal direction.

As illustrated in FIG. 2, the center core 10 is located in the center of the cladding 20. The first core 11 is disposed at a position overlapped with a first line segment L1 extending from the center of the center core 10 in the radial direction. The second core 12 is disposed at a position overlapped with a second line segment L2 extending from the center of the center core 10 in the radial direction at an angle of 90 degrees to the first line segment L1. The third core 13 is disposed at a position overlapped with a third line segment L3 extending from the center of the center core 10 in the radial direction at an angle of 67.5 degrees to the first line segment L1 and at an angle of 157.5 degrees to the second line segment L2. The fourth core 14 is disposed at a position overlapped with a fourth line segment L4 extending from the center of the center core 10 in the radial direction at an angle of 67.5 degrees to the second line segment L2 and at an angle of 135 degrees to the third line segment L3. The fifth core 15 is disposed at a position overlapped with a fifth line segment L5 extending from the center of the center core 10 in the radial direction at an angle of 67.5 degrees to the third line segment L3 and at an angle of 67.5 degrees to the fourth line segment L4.

Note that, as described above, the small-diameter portion 33 is formed by stretching the large-diameter portion 31. Thus, the ratios of the outer diameter of the cladding 20 to the diameters of the cores are not changed in any portions of the multicore fiber 1. Therefore, the diameters of the cores in the small-diameter portion 33 are smaller than the diameters of the cores in the large-diameter portion 31.

Figure 3A:
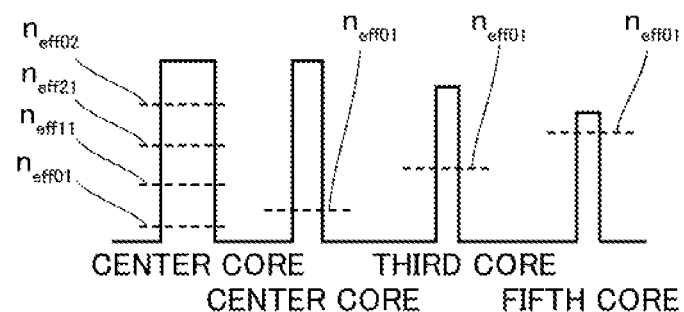
FIGS. 3A and 3B are diagrams of the profiles of the relative refractive index differences of cores to a cladding in the large-diameter portion and the small-diameter portion of the multicore fiber in FIG. 1.
Figure 3B:
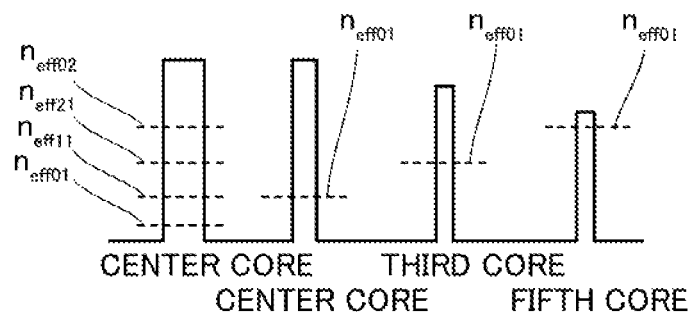

FIGS. 3A and 3B are diagrams of the profiles of the relative refractive index differences of the cores to the cladding in the large-diameter portion and the small-diameter portion of the multicore fiber in FIG. 1. Specifically, FIG. 3A is a diagram of the profiles of the relative refractive index differences of the cores to the cladding in the large-diameter portion 31. FIG. 3B is a diagram of the profiles of the relative refractive index differences of the cores to the cladding in the small-diameter portion 33. Note that, the refractive index profile of the first core 11 is similar to the refractive index profile of the second core 12, and the refractive index profile of the third core 13 is similar to the refractive index profile of the fourth core 14. Thus, in FIGS. 3A and 3B, the refractive index profiles of the center core 10, the first core 11, and the third core 13 are shown, but the refractive index profiles of the second core 12 and the fourth core 14 are not shown. In FIGS. 3A and 3B, effective refractive indices $n_{eff}$ of LP mode light beams propagated through the cores are expressed by broken lines.

As illustrated in FIGS. 3A and 3B, the center core 10 is a few-mode core that propagates an $LP_{01}$ mode light beam, an $LP_{11}$ mode light beam, an $LP_{21}$ mode light beam, and an $LP_{02}$ mode light beam and reduces the propagation of light beams in modes higher than these modes.

In the large-diameter portion 31, the propagation constants of the LP mode light beams propagated through the center core 10 are not matched with the propagation constants of the LP mode light beams propagated through the first core 11, the second core 12, the third core 13, the fourth core 14, and the fifth core 15. The propagation constants correspond to the effective refractive indices $n_{eff}$. Thus, in the embodiment, in the LP mode light beams propagated through the center core 10 in the large-diameter portion 31, an effective refractive index $n_{eff01}$ of the $LP_{01}$ mode light beam, an effective refractive index $n_{eff11}$ of the $LP_{11}$ mode light beam, an effective refractive index $n_{eff21}$ of the $LP_{21}$ mode light beam, and an effective refractive index $n_{eff02}$ of the $LP_{02}$ mode light beam are not matched with effective refractive indices $n_{eff01}$ of the $LP_{01}$ mode light beams propagated through the first core 11, the second core 12, the third core 13, the fourth core 14, and the fifth core 15. Thus, in the large-diameter portion 31, the inter-core crosstalk between the LP mode light beams propagated through the center core 10 and the $LP_{01}$ mode light beams propagated through the other cores is reduced. Consequently, in the large-diameter portion 31, the occurrence of multiplexing and demultiplexing of different mode light beams is reduced. Therefore, the large-diameter portion 31 is a different mode non-interaction section.

On the other hand, as described above, the diameters of the cores in the small-diameter portion 33 are different from the diameters of the cores in the large-diameter portion 31. Thus, the effective refractive indices $n_{eff}$ in the small-diameter portion 33 are different from the effective refractive indices $n_{eff}$ in the large-diameter portion 31. In the small-diameter portion 33, an effective refractive index $n_{eff11}$ of the $LP_{11}$ mode light beam propagated through the center core 10 is matched with effective refractive indices $n_{eff01}$ of the $LP_{01}$ mode light beams propagated through the second core 12 and the first core 11, an effective refractive index $n_{eff21}$ of the $LP_{11}$ mode light beam propagated through the center core 10 is matched with effective refractive indices $n_{eff01}$ of the $LP_{01}$ mode light beams propagated through the third core 13 and the fourth core 14, and an effective refractive index $n_{eff01}$ of the $LP_{02}$ mode light beam propagated through the center core 10 is matched with an effective refractive index $n_{eff01}$ of the $LP_{01}$ mode light beam propagated through the fifth core 15. In other words, the propagation constant of the $LP_{11}$ mode light beam propagated through the center core 10 is matched with the propagation constants of the $LP_{01}$ mode light beams propagated through the first core 11 and the second core 12, the propagation constant of the $LP_{21}$ mode light beam propagated through the center core 10 is matched with the propagation constants of the $LP_{01}$ mode light beams propagated through the third core 13 and the fourth core 14, and the propagation constant of the $LP_{02}$ mode light beam propagated through the center core 10 is matched with the propagation constant of the $LP_{02}$ mode light beam propagated through the fifth core 15. Thus, in the small-diameter portion 33, crosstalk occurs between the $LP_{11}$ mode light beam propagated through the center core 10 and the $LP_{01}$ mode light beams propagated through the first core 11 and the second core 12, crosstalk occurs between the $LP_{21}$ mode light beam propagated through the center core 10 and the $LP_{01}$ mode light beams propagated through the third core 13 and the fourth core 14, and crosstalk occurs between the $LP_{02}$ mode light beam propagated through the center core 10 and the $LP_{01}$ mode light beam propagated through the fifth core 15. Consequently, in the small-diameter portion 33, mode-multiplexing and mode-demultiplexing occurs between the light beams propagated through the center core 10 and the light beams propagated through the other cores. Therefore, the small-diameter portion 33 is a different mode interaction section.

In the multicore fiber 1 according to the embodiment, when the $LP_{01}$ mode light beam is entered to the center core 10, the first core 11, the second core 12, the third core 13, the fourth core 14, and the fifth core 15, in the small-diameter portion 33, the $LP_{01}$ mode light beams propagated through the first core 11 and the second core 12 are multiplexed as the $LP_{11}$ mode light beam on the center core 10, the $LP_{01}$ mode light beams propagated through the third core 13 and the fourth core 14 are multiplexed as the $LP_{21}$ mode light beam on the center core 10, and the $LP_{01}$ mode light beam propagated through the fifth core 15 is multiplexed as the $LP_{02}$ mode light beam on the center core 10. In the case in which the $LP_{01}$ mode, the $LP_{11}$ mode, the $LP_{21}$ mode, and the $LP_{02}$ mode light beams are entered to the center core 10 and no light beam is entered to the first core 11, the second core 12, the third core 13, the fourth core 14, and the fifth core 15, in the small-diameter portion 33, the $LP_{11}$ mode light beam propagated through the center core 10 is demultiplexed as the $LP_{01}$ mode light beam to the first core 11 and the second core 12, the $LP_{21}$ mode light beam propagated through the center core 10 is demultiplexed as the $LP_{01}$ mode light beam to the third core 13 and the fourth core 14, and the $LP_{02}$ mode light beam propagated through the center core 10 is demultiplexed as the $LP_{01}$ mode light beam to the fifth core 15. In this manner, mode-multiplexing and mode-demultiplexing is achieved in the multicore fiber 1.

Here, the multiplexing and demultiplexing of the $LP_{11}$ mode light beam propagated through the center core 10 and the $LP_{01}$ mode light beams propagated through the first core 11 and the second core 12 will be described in more detail.

In the $LP_{11}$ mode light beam, which is propagated through a core, based on a straight line passing the center of the core and extending in the radial direction, a positive electric field is distributed on one side, a negative electric field is distributed on the other side, and energy distributions are the same on the one side and the other side. Thus, when the $LP_{11}$ mode light beam is rotated at an angle of 180 degrees based on the center of the core, through which the $LP_{11}$ mode light beam is propagated, its energy distribution is the same as one before rotated, whereas when the $LP_{11}$ mode light beam is rotated at an angle other than an angle of 180 degrees, its energy distribution is different from one before rotated. The $LP_{01}$ mode light beam is still referred to as the $LP_{11}$ mode light beam even though two $LP_{11}$ mode light beams are multiplexed with each other, which are in the relationship in which they are rotated at an angle of 90 degrees.

Therefore, one of two $LP_{11}$ mode light beam in the relationship in which they are rotated at an angle of 90 degrees is defined as an $LP_{11}a$ mode light beam, the other is defined as an $LP_{11}b$ mode light beam, and the $LP_{11}$ mode light beam propagated through the center core 10 is the total of the $LP_{21}a$ mode light beam and the $LP_{11}b$ mode light beam. Under these conditions, the case is assumed in which the $LP_{11}$ mode light beam propagated through the center core 10 is mode-demultiplexed to the $LP_{01}$ mode light beams propagated through the first core 11 and the second core 12. In this case, a tendency is observed, in which the $LP_{11}a$ mode light beam is demultiplexed to the $LP_{01}$ mode light beam propagated through one of the first core 11 and the second core 12 and the $LP_{11}b$ mode light beam is demultiplexed to the $LP_{01}$ mode light beam propagated through the other of the first core 11 and the second core 12. The case is assumed in which the $LP_{01}$ mode light beams propagated through the first core 11 and the second core 12 are mode-multiplexed with the $LP_{11}$ mode light beam propagated through the center core 10. In this case, a tendency is observed, in which the light beam propagated through one of the first core 11 and the second core 12 is multiplexed with the $LP_{11}a$ mode light beam propagated through the center core 10, and the light beam propagated through the other of the first core 11 and the second core 12 is multiplexed with the $LP_{11}b$ mode light beam propagated through the center core 10.

Next, the multiplexing and demultiplexing of the $LP_{21}$ mode light beam propagated through the center core 10 and the $LP_{01}$ mode light beams propagated through the third core 13 and the fourth core 14 will be described in more detail.

In four regions divided by two straight lines that are perpendicular to each other, pass the center of the core, and extend in the radial direction, the $LP_{21}$ mode light beam propagated through the core has electric field distributions in regions adjacent to each other. The electric field distributions have inverted polarities, i.e. positive and negative polarities, and have the same energy distributions in the adjacent regions. Thus, when the $LP_{21}$ mode light beam is rotated at an angle of 90 degrees based on the center of the core through which the $LP_{21}$ mode light beam is propagated, the $LP_{21}$ mode light beam has the same energy distribution before rotated, whereas when the $LP_{21}$ mode light beam is rotated at an angle other than an angle of 90 degrees, its energy distribution is different from one before rotated. The $LP_{21}$ mode light beam is still referred to as the $LP_{21}$ mode light beam even though two $LP_{21}$ mode light beams are multiplexed with each other, which are in the relationship in which they are rotated at an angle of 45 degrees+90n degrees (n is an integer of zero or greater), such as at an angle of 45 degrees or an angle of 135 degrees.

Therefore, for example, one of two $LP_{21}$ mode light beams in the relationship in which they are rotated at an angle of 45 degrees+90n degrees (n is an integer of zero or greater) is defined as an $LP_{21}a$ mode light beam, the other is defined as an $LP_{21}b$ mode light beam, and the $LP_{21}$ mode light beam propagate through the first core 11 is the total of the $LP_{21}a$ mode light beam and the $LP_{21}b$ mode light beam. Under these conditions, the case is assumed in which the $LP_{21}$ mode light beam propagated through the center core 10 is mode-demultiplexed with the $LP_{01}$ mode light beams propagated through the third core 13 and the fourth core 14. In this case, a tendency is observed, in which the $LP_{21}a$ mode light beam is demultiplexed to the $LP_{01}$ mode light beam propagated through one of the third core 13 and the fourth core 14 and the $LP_{21}b$ mode light beam is demultiplexed to the $LP_{01}$ mode light beam propagated through the other of the third core 13 and the fourth core 14. The case is assumed in which the $LP_{01}$ mode light beams propagated through the third core 13 and the fourth core 14 are mode-multiplexed with the $LP_{21}$ mode light beam propagated through the center core 10. In this case, a tendency is observed, in which the light beam propagated through one of the third core 13 and the fourth core 14 is multiplexed with the $LP_{21}a$ mode light beam propagated through the center core 10 and the light beam propagated through the other of the third core 13 and the fourth core 14 is multiplexed with the $LP_{21}b$ mode light beam propagated through the center core 10.

As described above, in the small-diameter portion 33, mode-multiplexing and mode-demultiplexing is achieved. According to the multicore fiber 1 of the embodiment, information can be superposed on the $LP_{01}$ mode, the $LP_{11}a$ mode, the $LP_{11}b$ mode, the $LP_{21}a$ mode, the $LP_{21}b$ mode, and the $LP_{02}$ mode light beams. Thus, optical communications with a larger amount of information can be performed.

Next, the distances between the cores, the relative refractive index differences of the cores to the cladding 20, and the radii of the cores will be described.

When a distance from the center of the center core 10 to the center of the first core 11 is defined as $g_1$, a distance from the center of the center core 10 to the center of the second core 12 is defined $g_2$, a distance from the center of the center core 10 to the center of the third core 13 is defined as $g_3$, a distance from the center of the center core 10 to the center of the fourth core 14 is defined as $g_4$, and a distance from the center of the center core 10 to the center of the fifth core 15 is defined as $g_5$, Expression (1) is preferably held. In other words, the distance $g_5$ from the center of the center core 10 to the center of the fifth core 15 is preferably longer than the distance $g_3$ from the center of the center core 10 to the center of the third core 13 and the distance $g_4$ from the center of the center core 10 to the center of the fourth core 14, and the distance $g_3$ from the center of the center core 10 to the center of the third core 13 and the distance $g_4$ from the center of the center core 10 to the center of the fourth core 14 are preferably longer than the distance $g_1$ from the center of the center core 10 to the center of the first core 11 and the distance $g_2$ from the center of the center core 10 to the center of the second core 12.

$$g_1, g_2 < g_3, g_4 < g_5 \quad (1)$$

The present inventor found that the distances from the center core 10 to the other cores satisfy the conditions in Expression (1) and hence the mode selection ratio is improved in the small-diameter portion 33 in the case in which light beams in the C-band are propagated, as described later in an example. Here, the term "mode selection ratio" means the ratio of the power of the multiplexed light beam emitted from the center core 10 to the power of the light beam entered to any one of the first to the fifth cores. For example, the mode selection ratio of the $LP_{11}$ mode means the ratio of the power of the $LP_{11}$ mode light beam emitted from the center core 10 to the power of the $LP_{01}$ mode light beam entered to the first core 11 or the second core 12. Mode-multiplexing is more efficiently performed, as the mode selection ratio is higher.

In the large-diameter portion 31, the distances from the center core 10 to the other cores are preferably 19 μm or more and 24 μm or less.

When the relative refractive index difference of the center core 10 to the cladding 20 is defined as $\Delta_c$, the relative refractive index difference of the first core 11 to the cladding 20 is defined as $\Delta_1$, the relative refractive index difference of the second core 12 to the cladding 20 is defined as $\Delta_2$, the relative refractive index difference of the third core 13 to the cladding 20 is defined as $\Delta_3$, the relative refractive index difference of the fourth core 14 to the cladding 20 is defined as $\Delta_4$, and the relative refractive index difference of the fifth core 15 to the cladding 20 is defined as $\Delta_5$, Expression (2) may be held. In other words, the relative refractive index difference $\Delta_c$ of the center core 10 to the cladding 20 may be equal to or greater than the relative refractive index difference $\Delta_1$ of the first core 11 to the cladding 20 and the relative refractive index difference $\Delta_2$ of the second core 12 to the cladding 20, the relative refractive index difference $\Delta_1$ of the first core 11 to the cladding 20 and the relative refractive index difference $\Delta_2$ of the second core 12 to the cladding 20 may be greater than the relative refractive index difference $\Delta_3$ of the third core 13 to the cladding 20 and the relative refractive index difference $\Delta_4$ of the fourth core 14 to the cladding 20, and the relative refractive index difference $\Delta_3$ of the third core 13 to the cladding 20 and the relative refractive index difference $\Delta_4$ of the fourth core 14 to the cladding 20 may be greater than the relative refractive index difference $\Delta_5$ of the fifth core 15 to the cladding 20.

$$\Delta_c \geq \Delta_1, \Delta_2 > \Delta\Delta_3, \Delta_4 > \Delta_5 \quad (2)$$

The radius of the center core 10 is defined as $r_c$, the radius of the first core 11 is defined as $r_1$, the radius of the second core 12 is defined as $r_2$, the radius of the third core 13 is defined as $r_3$, the radius of the fourth core 14 is defined as $r_4$, and the radius of the fifth core 15 is defined as $r_5$, Expression (3) may be held. In other words, the radius $r_c$ of the center core 10 may be greater than the radius $r_1$ of the first core 11 and the radius $r_2$ of the second core 12, the radius $r_1$ of the first core 11 and the radius $r_2$ of the second core 12 may be greater than the radius $r_3$ of the third core 13 and the radius $r_4$ of the fourth core 14, and the radius $r_3$ of the third core 13 and the radius $r_4$ of the fourth core 14 may be greater than the radius $r_5$ of the fifth core 15.

$$r_c > r_1, r_2 > r_3, r_4 > r_5 \quad (3)$$

As described below, in the multicore fiber 1, the first core 11, the second core 12, the third core 13, the fourth core 14, and the fifth core 15 are disposed so that they are apart from each other at the maximum in a range in which mode-multiplexing and mode-demultiplexing is feasible as described above.

The first core 11 and the second core 12 serve for multiplexing and demultiplexing the $LP_{11}a$ mode and the $LP_{11}b$ mode light beams as described above. Thus, they are disposed on the first line segment L1 and the second line segment L2 crossing each other in the center of the center core 10 at an angle of 90 degrees. The third core 13 and the fourth core 14 serve for multiplexing and demultiplexing the $LP_{21}a$ mode and the $LP_{21}b$ mode light beams as described above. Thus, they are disposed on the third line segment L3 and the fourth line segment L4 crossing each other in the center of the center core 10 at an angle of 135 degrees. Here, the $LP_{02}$ mode is an even mode. Thus, from the viewpoint in which the cores are disposed being matched with the field shape of the $LP_{02}$ mode light beam for mode-multiplexing and mode-demultiplexing, the direction, in which the fifth core 15 serving for multiplexing and demultiplexing the $LP_{02}$ mode light beam has to be disposed, is not specifically limited. However, the positional relationship between the other cores might increase unintentional inter-core crosstalk. Therefore, in the multicore fiber 1 according to the embodiment, the third core 13 is disposed at the position overlapped with the third line segment L3 extending from the center of the center core 10 in the radial direction at an angle of 67.5 degrees to the first line segment L1. The fourth core 14 is disposed at the position overlapped with the fourth line segment L4 extending from the center of the center core 10 in the radial direction at an angle of 67.5 degrees to the second line segment L2. The fifth core 15 is disposed at the position overlapped with the fifth line segment L5 extending from the center of the center core 10 in the radial direction at an angle of 67.5 degrees to the third line segment L3 and at an angle of 67.5 degrees to the fourth line segment L4. In this manner, the first core 11, the second core 12, the third core 13, the fourth core 14, and the fifth core 15 are disposed apart from each other. Consequently, unintentional inter-core crosstalk caused by light beams propagated through the cores is easily reduced.

As described above, the present invention is described as the foregoing embodiment is taken as an example. However, the present invention is not limited to this embodiment. For example, in the embodiment, the refractive index profile of the center core is a so-called step index type in which the refractive index is almost constant in the radial direction. However, the refractive index profile of the center core may be a so-called ring index type, in which the center part has a refractive index lower than the refractive index of the outer circumferential part. In the case in which the refractive index of the core is a step index type, the difference between the effective refractive index of the $LP_{21}$ mode light beam and the effective refractive index of the $LP_{02}$ mode light beam is small. On the other hand, in the case in which the refractive index of the core is a ring index type, the difference between the effective refractive index of the $LP_{21}$ mode light beam and the effective refractive index of the $LP_{02}$ mode light beam can be increased. Thus, when the refractive index profile of the center core is a ring index type, the inter-mode crosstalk in the core between the $LP_{21}$ mode light beam and the $LP_{02}$ mode light beam propagated through the center core is easily reduced.

In the embodiment, examples of the core pitches between the center core 10 and the other cores, the relationship between the relative refractive index differences of the cores to the cladding 20, and the range of the radii of the cores are described. However, these values are not specifically limited in a range that can solve the problems of the present invention.

In the embodiment, the center core 10 is located in the center of the cladding 20. However, the center core 10 does not necessarily have to be located in the center of the cladding 20.

In the description of the present invention so far, attention is focused on the directions in which the first to the fifth cores are disposed when viewed from the center core 10. From the viewpoint of improving the mode selection ratio, the inventors found that the importance is the distances from the center core 10 to the cores. Therefore, from the viewpoint of improving the mode selection ratio, at least one of Expressions (4) and (5) is preferably held $$g_1 \text{ or } g_2 < g_3 \text{ or } g_4 \quad (4)$$

$$g_1 \text{ or } g_2 < g_3 \text{ or } g_4 < g_5 \quad (5)$$

where the distance from the center core 10 to the center of the first core 11 is defined as $g_1$, the distance from the center of the center core 10 to the center of the second core 12 is defined as $g_2$, the distance from the center of the center core 10 to the center of the third core 13 is defined as $g_3$, the distance from the center of the center core 10 to the center of the fourth core 14 is defined as $g_4$, and the distance from the center of the center core 10 to the center of the fifth core 15 is defined as $g_5$.

In Expressions (4) and (5), the term "$g_1$ or $g_2$" means that at least one of the first core 11 and the second core 12 only has to be provided. In Expressions (4) and (5), the term "$g_3$ or $g_4$" means that at least one of the third core 13 and the fourth core 14 only has to be provided. Note that, in the case in which Expression (4) is satisfied, the fifth core 15 does not necessarily have to be provided.

EXAMPLE

In the following, the present invention will be described more in detail based on an example. However, the present invention is not limited to the example below.

Example 1

In Example 1, the design of a multicore fiber corresponding to the multicore fiber 1 according to the embodiment was investigated.

Design of the Center Core

The center core 10 propagates the $LP_{01}$ mode, the $LP_{11}$ mode, the $LP_{21}$ mode, and the $LP_{02}$ mode light beams in the C-band in the large-diameter portion 31 and in the small-diameter portion 33. The conditions for the design of the function of the center core 10 were investigated as below.

Figure 4:
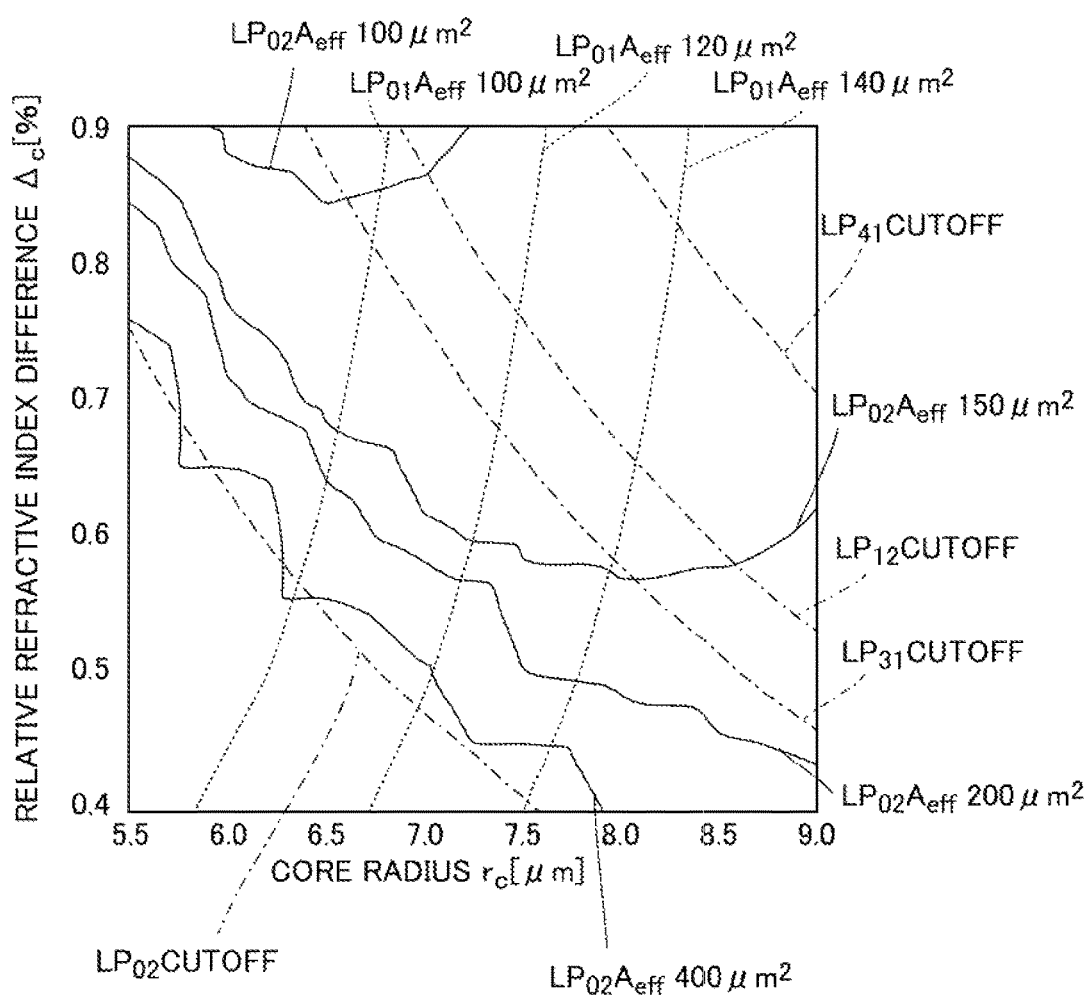
FIG. 4 is a diagram of the relationship among a radius $r_c$ of a center core, a relative refractive index difference $\Delta_c$ of the center core to the cladding, effective cross sectional areas $A_{eff}$ of an $LP_{02}$ mode light beam and an $LP_{01}$ mode light beam propagated through the center core, and the cutoff wavelengths of mode light beams.

In FIG. 4, the horizontal axis expresses the radius $r_c$ [µm] of the center core 10, and the vertical axis expresses the relative refractive index difference $\Delta_c$ [%] of the center core 10 to the cladding 20. FIG. 4 shows the effective cross sectional areas $A_{eff}$ [µm²] of the $LP_{01}$ mode light beam and the $LP_{02}$ mode light beam propagated through the center core 10 and the cutoff wavelengths of an $LP_{41}$ mode light beam, an $LP_{12}$ mode light beam, an $LP_{31}$ mode light beam, and an $LP_{02}$ mode light beam. Note that, the wavelengths of the light beams to be propagated were set to a wavelength of 1,550 nm.

The inter-mode crosstalk is more easily reduced in the center core 10, as the relative refractive index difference $\Delta_c$ is greater, but the preparation of a preform is more difficult. Thus, the inventors thought that the relative refractive index difference $\Delta_c$ was preferably 0.9%. FIG. 4 shows that in the case in which the relative refractive index difference $\Delta_c$ is 0.9%, the $LP_{02}$ mode light beam is not cut off even though the radius $r_c$ of the center core 10 in the large-diameter portion 31 is set to 8.82 µm and the stretch ratio is about 1.4. Under these conditions, the effective cross sectional area $A_{eff}$ of the $LP_{02}$ mode light beam is as small as the effective cross sectional area $A_{eff}$ of the $LP_{01}$ mode light beam. Thus, it is revealed that inter-core crosstalk is easily reduced. Note that, the term "stretch ratio" means the homothetic ratio of the small-diameter portion 33 to the large-diameter portion 31, which is the same value as the diameter of the multicore fiber in the large-diameter portion 31, where the diameter of the multicore fiber in the small-diameter portion 33 is one.

From the description above, in the large-diameter portion 31, the radius $r_c$ of the center core 10 was set to 8.82 µm, the relative refractive index difference $\Delta_c$ of the center core 10 to the cladding 20 was set to 0.9%, and the stretch ratio was set to 1.4.

Design of the First to the Fifth Cores Based on the design of the center core, which is a premise, the design of the first to the fifth cores was investigated.

The relative refractive index differences of the first to the fifth cores to the cladding 20 and the radii of the first to the fifth cores in the large-diameter portion 31 were determined as shown in Table 1 so that in the small-diameter portion 33, the propagation constant of the $LP_{11}$ mode light beam propagated through the center core 10 was matched with the propagation constants of the $LP_{01}$ mode light beams propagated through the first core 11 and the second core 12, the propagation constant of the $LP_{21}$ mode light beam propagated through the center core 10 was matched with the propagation constants of the $LP_{01}$ mode light beams propagated through the third core 13 and the fourth core 14, and the propagation constant of the $LP_{02}$ mode light beam propagated through the center core 10 was matched with the propagation constant of the $LP_{01}$ mode light beam propagated through the fifth core 15.

TABLE 1

|  | Relative refractive index difference [%] | Radius [µm] |
|---|---|---|
| First and second cores | 0.9 | 4.81 |
| Third and fourth cores | 0.7 | 3.84 |
| Fifth core | 0.6 | 3.77 |

Figure 5:
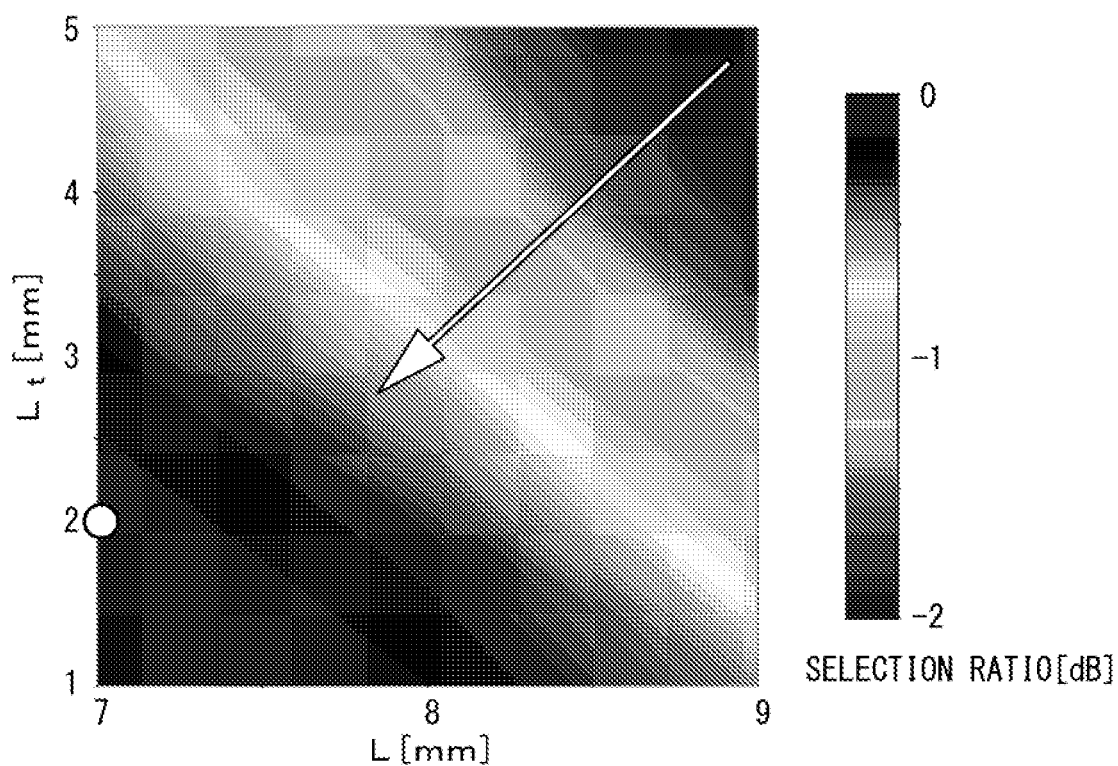
FIG. 5 is a diagram of the mode selection ratio of an $LP_{11}$ mode light beam when a distance from the center of the center core to the center of a first core is 19.5 µm, a distance from the center of the center core to the center of a third core is 21.0 µm, and a distance from the center of the center core to the center of a fifth core is 22.0 µm.
Figure 6:
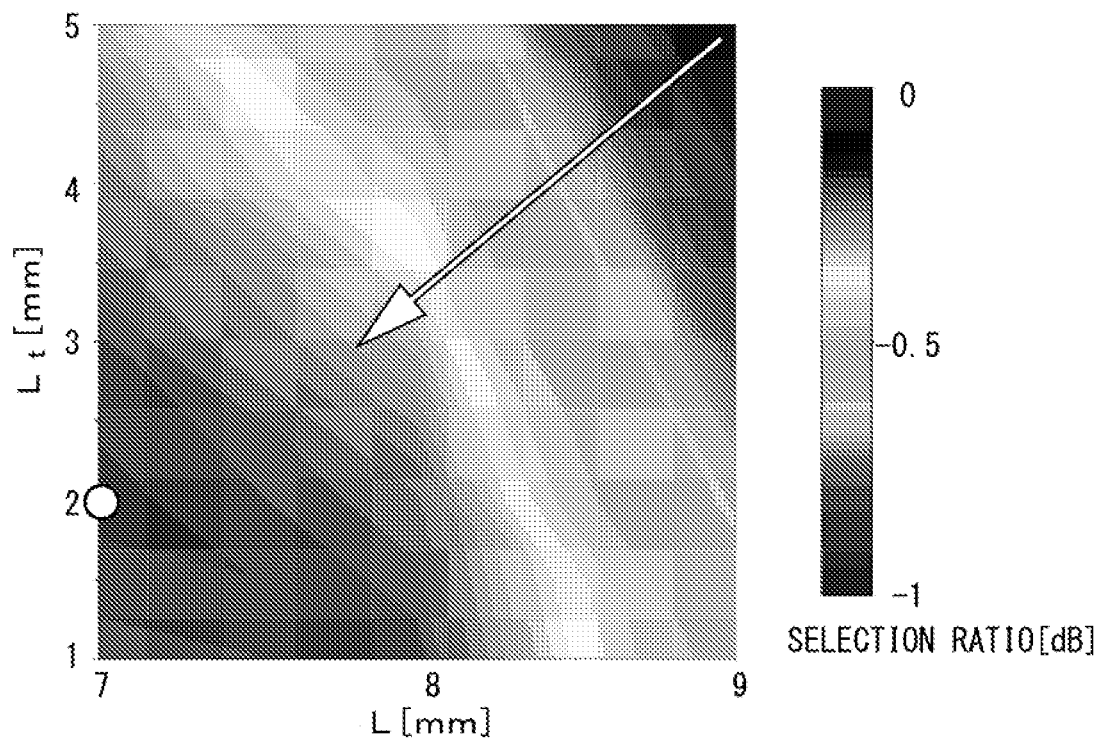
FIG. 6 is a diagram of the mode selection ratio of an $LP_{21}$ mode light beam when a distance from the center of the center core to the center of the first core is 19.5 µm, a distance from the center of the center core to the center of the third core is 21.0 µm, and a distance from the center of the center core to the center of the fifth core is 22.0 µm.
Figure 7:
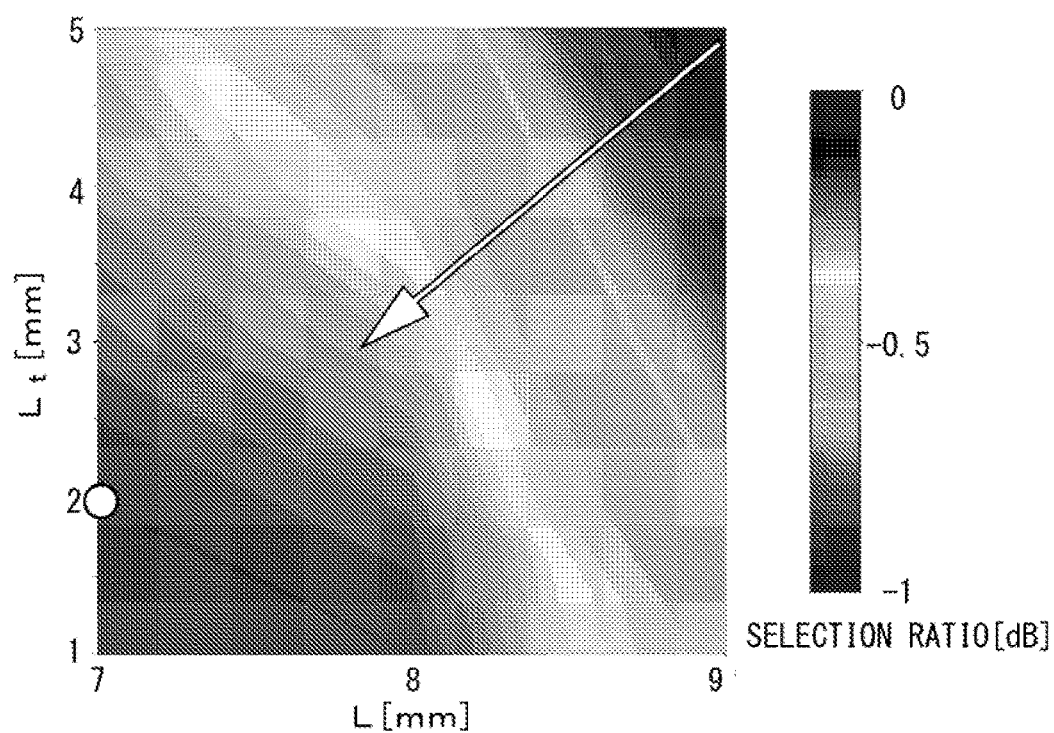
FIG. 7 is a diagram of the mode selection ratio of an $LP_{02}$ mode light beam when a distance from the center of the center core to the center of the first core is 19.5 µm, a distance from the center of the center core to the center of the third core is 21.0 µm, and a distance from the center of the center core to the center of the fifth core is 22.0 µm.
Figure 8:
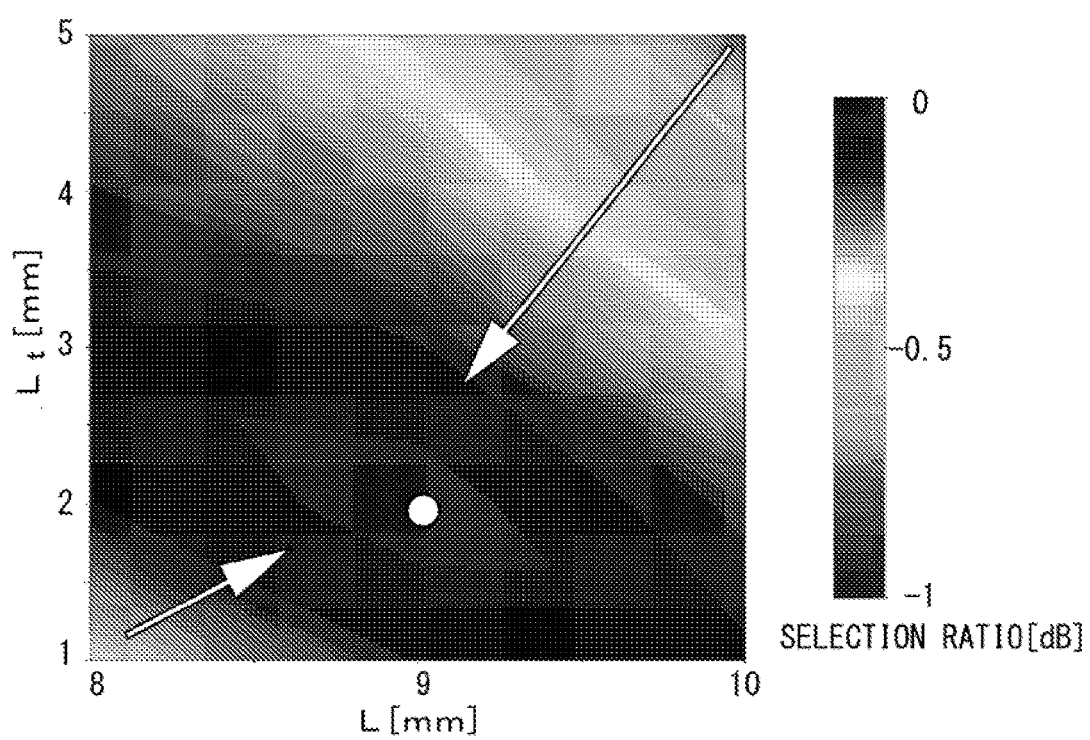
FIG. 8 is a diagram of the mode selection ratio of an $LP_{11}$ mode light beam when a distance from the center of the center core to the center of the first core is 20.0 µm, a distance from the center of the center core to the center of the third core is 21.5 µm, and a distance from the center of the center core to the center of the fifth core is 23.0 µm.
Figure 9:
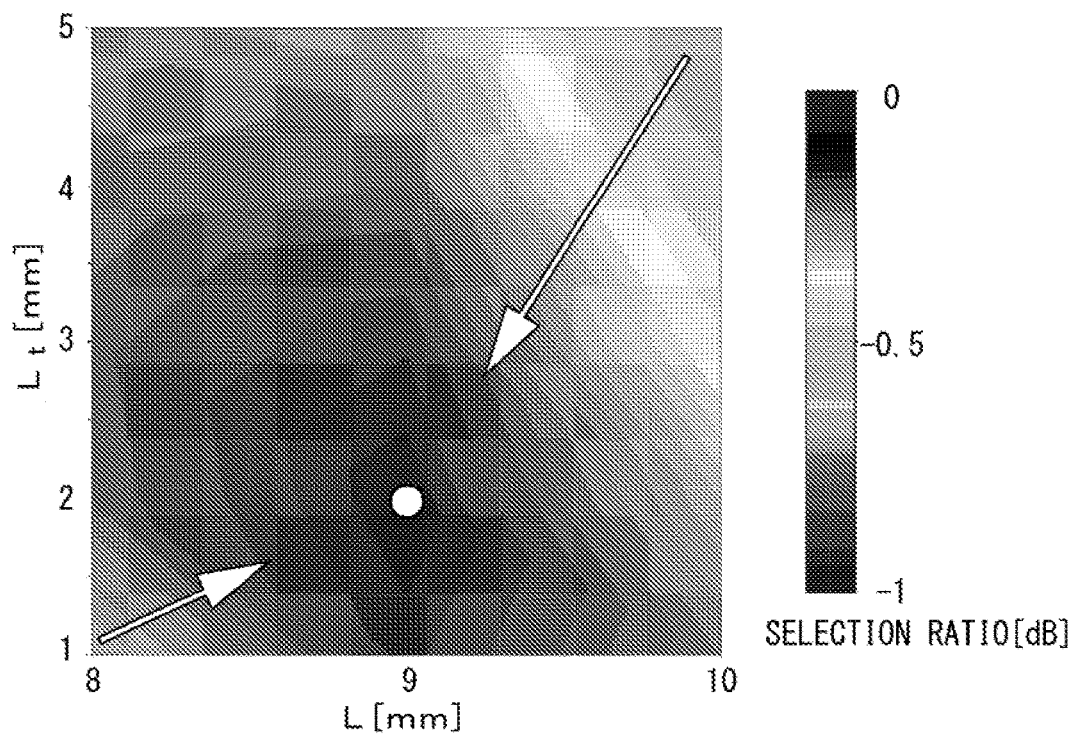
FIG. 9 is a diagram of the mode selection ratio of the $LP_{21}$ mode light beam when a distance from the center of the center core to the center of the first core is 20.0 µm, a distance from the center of the center core to the center of the third core is 21.5 µm, and a distance from the center of the center core to the center of the fifth core is 23.0 µm.
Figure 10:
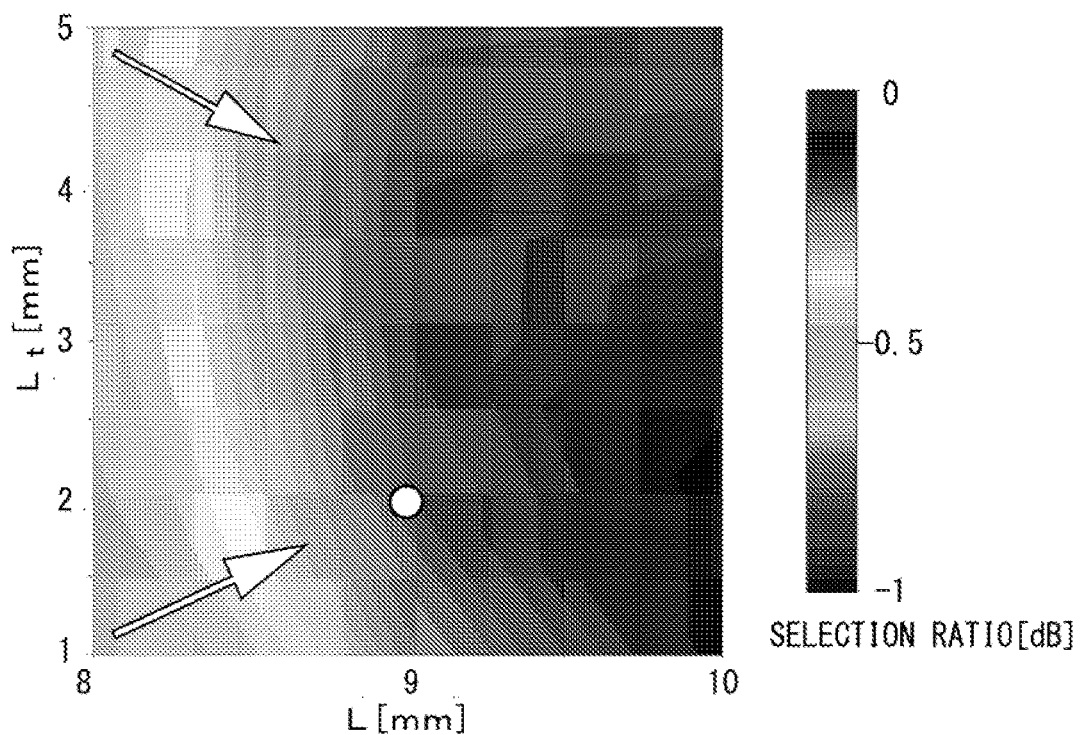
FIG. 10 is a diagram of the mode selection ratio of the $LP_{02}$ mode light beam when a distance from the center of the center core to the center of the first core is 20.0 µm, a distance from the center of the center core to the center of the third core is 21.5 µm, and a distance from the center of the center core to the center of the fifth core is 23.0 µm.
Figure 11:
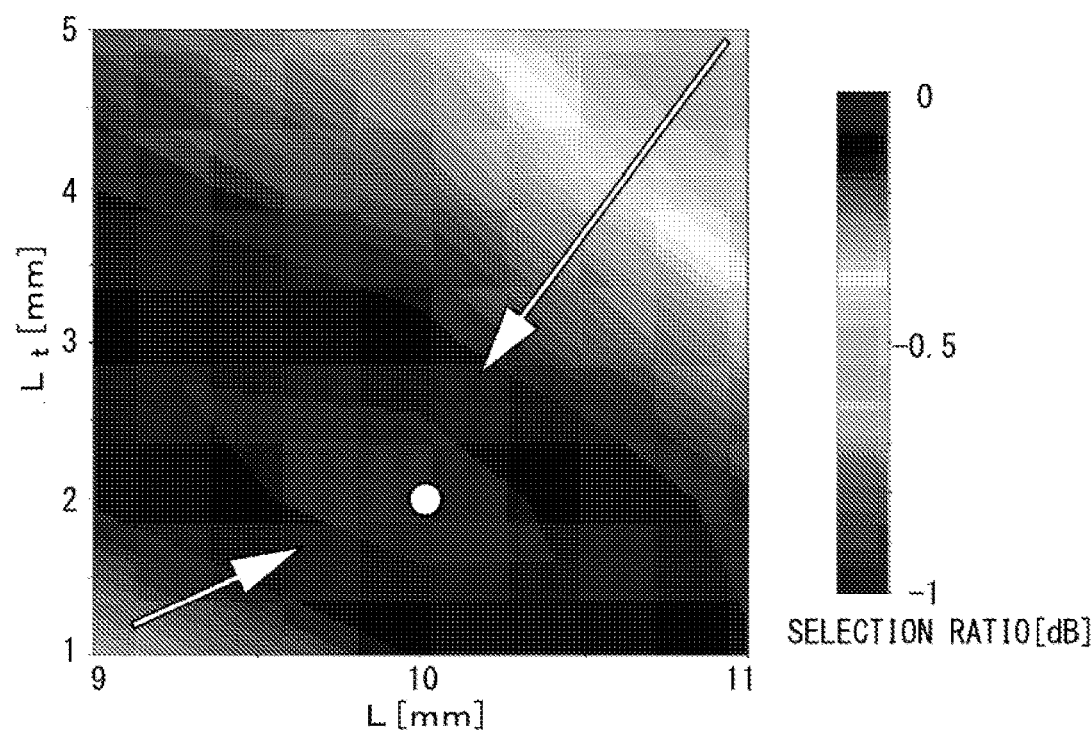
FIG. 11 is a diagram of the mode selection ratio of the $LP_{11}$ mode light beam when a distance from the center of the center core to the center of the first core is 20.2 µm, a distance from the center of the center core to the center of the third core is 22.0 µm, and a distance from the center of the center core to the center of the fifth core is 23.2 µm.
Figure 12:
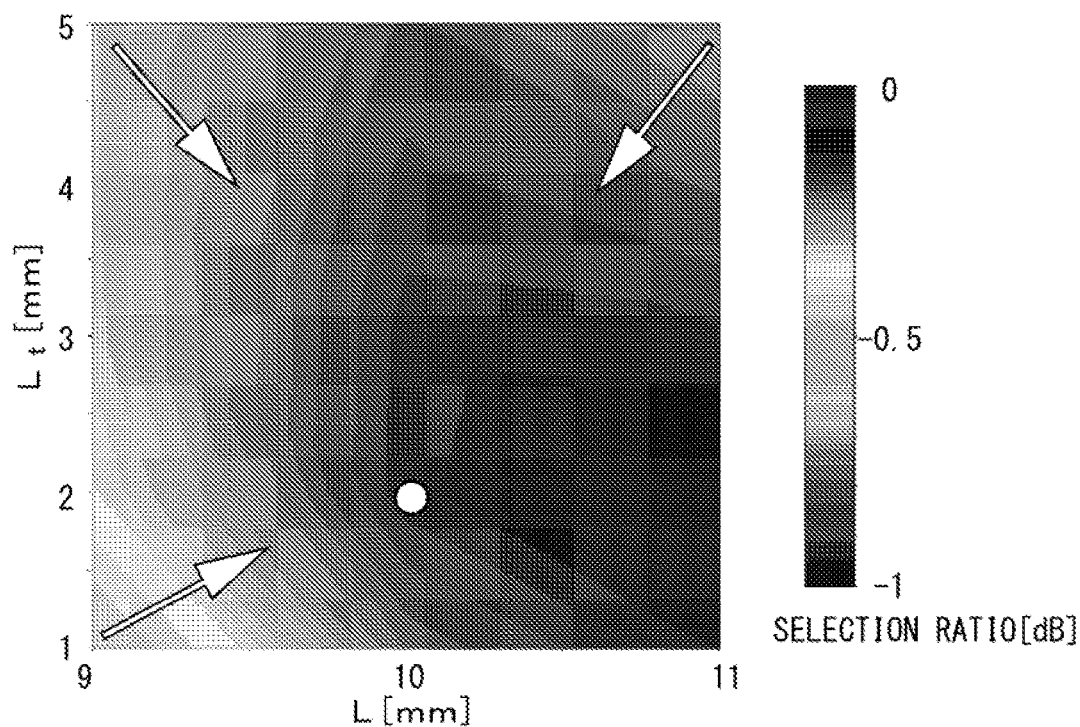
FIG. 12 is a diagram of the mode selection ratio of the $LP_{21}$ mode light beam when a distance from the center of the center core to the center of the first core is 20.2 µm, a distance from the center of the center core to the center of the third core is 22.0 µm, and a distance from the center of the center core to the center of the fifth core is 23.2 µm.
Figure 13:
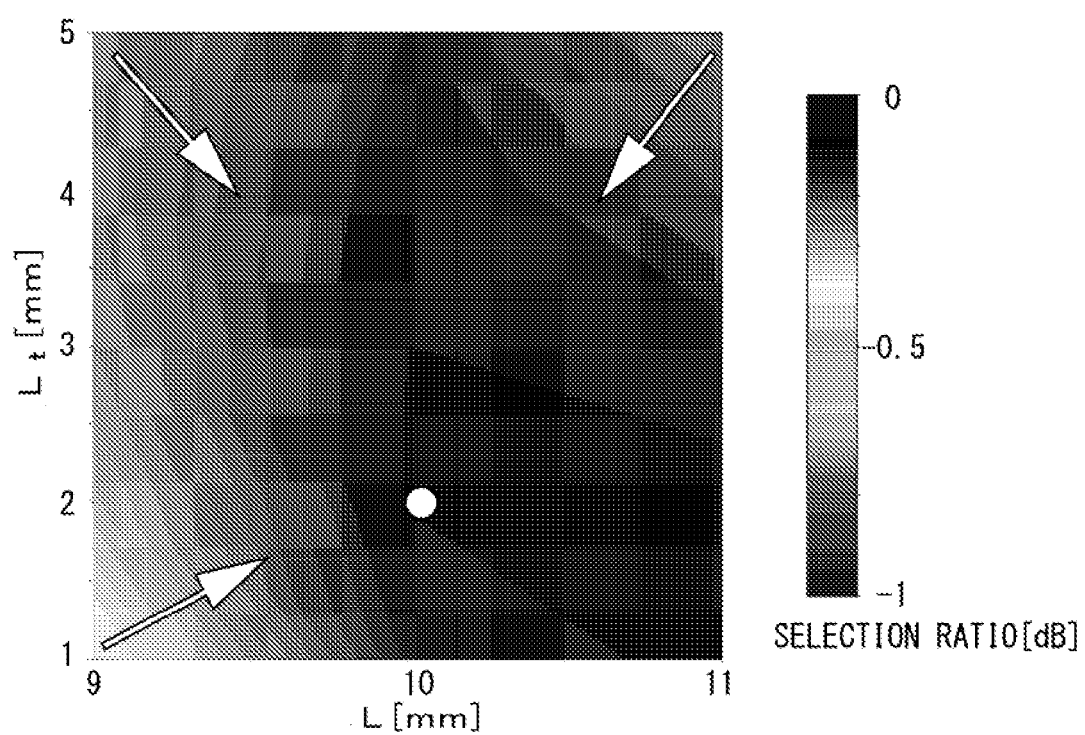
FIG. 13 is a diagram of the mode selection ratio of the $LP_{02}$ mode light beam when a distance from the center of the center core to the center of the first core is 20.2 µm, a distance from the center of the center core to the center of the third core is 22.0 µm, and a distance from the center of the center core to the center of the fifth core is 23.2 µm.
Figure 14:
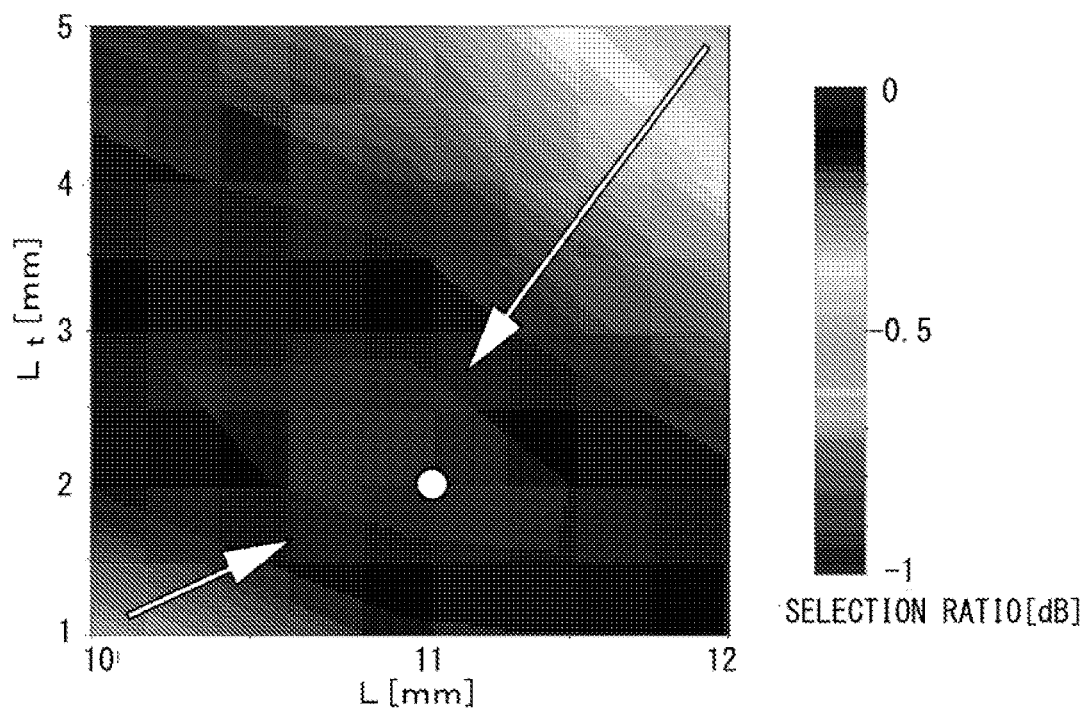
FIG. 14 is a diagram of the mode selection ratio of the $LP_{11}$ mode light beam when a distance from the center of the center core to the center of the first core is 20.4 µm, a distance from the center of the center core to the center of the third core is 22.2 µm, and a distance from the center of the center core to the center of the fifth core is 23.6 µm.
Figure 15:
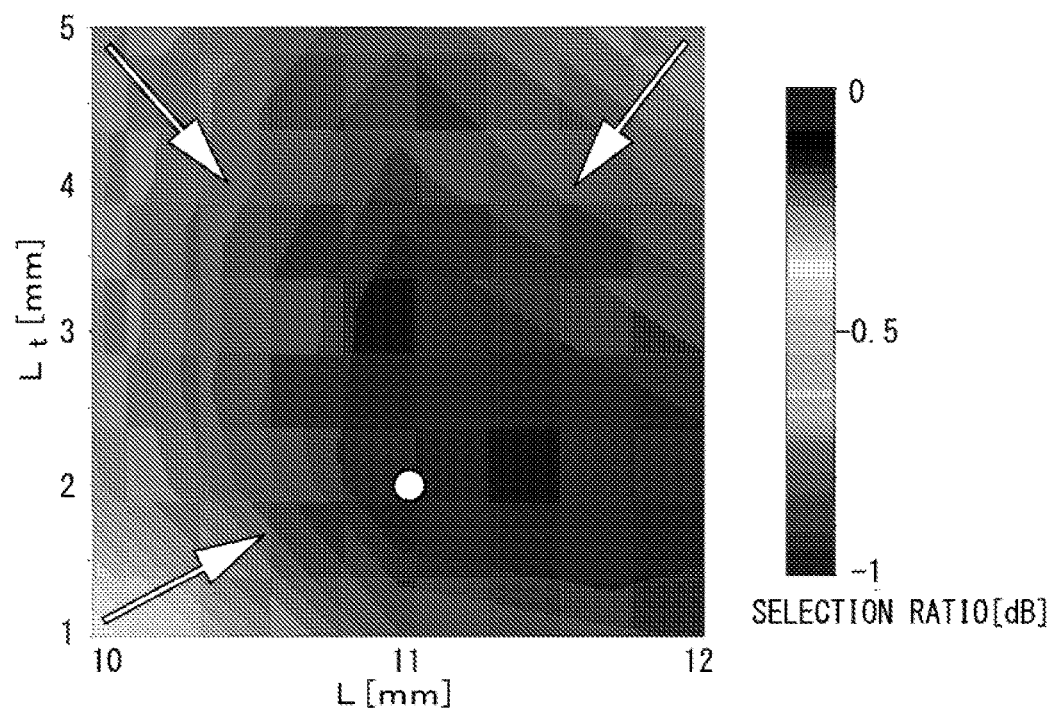
FIG. 15 is a diagram of the mode selection ratio of the $LP_{21}$ mode light beam when a distance from the center of the center core to the center of the first core is 20.4 µm, a distance from the center of the center core to the center of the third core is 22.2 µm, and a distance from the center of the center core to the center of the fifth core is 23.6 µm.
Figure 16:
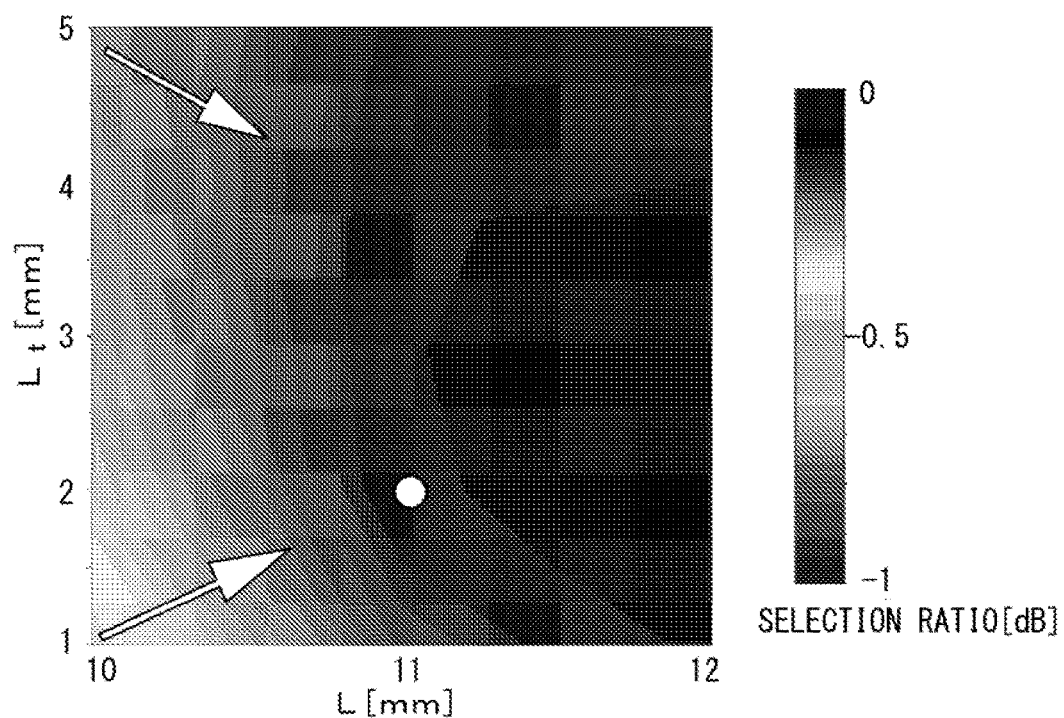
FIG. 16 is a diagram of the mode selection ratio of the $LP_{02}$ mode light beam when a distance from the center of the center core to the center of the first core is 20.4 µm, a distance from the center of the center core to the center of the third core is 22.2 µm, and a distance from the center of the center core to the center of the fifth core is 23.6 µm.

The distances from the center core 10 to the other cores were investigated when the mode selection ratios of the LP mode light beams were increased at the maximum. FIGS. 5 to 16 show the results. In FIGS. 5 to 16, the horizontal axis expresses a length Lt [mm] of the tapered portion 32, and the vertical axis expresses a length L [mm] of the small-diameter portion 33. In FIGS. 5 to 16, a blank arrow expresses the direction in which the mode selection ratio is increased. FIGS. 5 to 7 show the case in which the distance $g_1$ from the center of the center core 10 to the center of the first core 11 was set to 19.5 µm, the distance $g_3$ from the center of the center core 10 to the center of the third core 13 was set to 21.0 µm, and the distance $g_5$ from the center of the center core 10 to the center of the fifth core 15 was set to 22.0 µm. FIG. 8 to FIG. 10 show the case in which the distance $g_1$ from the center of the center core 10 to the center of the first core 11 was set to 20.0 µm, the distance $g_3$ from the center of the center core 10 to the center of the third core 13 was set to 21.5 µm, and the distance $g_5$ from the center of the center core 10 to the center of the fifth core 15 was set to 23.0 µm. FIGS. 11 to 13 show the case in which the distance $g_1$ from the center of the center core 10 to the center of the first core 11 was set to 20.2 µm, the distance $g_3$ from the center of the center core 10 to the center of the third core 13 was set to 22.0 µm, and the distance $g_5$ from the center of the center core 10 to the center of the fifth core 15 was set to 23.2 µm. FIGS. 14 to 16 show the case in which the distance $g_1$ from the center of the center core 10 to the center of the first core 11 was set to 20.4 µm, the distance $g_3$ from the center of the center core 10 to the center of the third core 13 was set to 22.2 µm, and the distance $g_5$ from the center of the center core 10 to the center of the fifth core 15 was set to 23.6 µm. FIGS. 5, 8, 11, and 14 show the mode selection ratio [dB] of the $LP_{11}$ mode. FIGS. 6, 9, 12, and 15 show the mode selection ratio [dB] of the $LP_{21}$ mode. FIGS. 7, 10, 13, and 16 show the mode selection ratio [dB] of the $LP_{02}$ mode.

In FIGS. 5 to 16, white circles in the drawings show the conditions in which the selection ratios in the modes can be increased as much as possible. Under the conditions shown in FIGS. 5 to 7, it is revealed that preferable conditions are Lt=2 mm and L=7 mm. In the following, these conditions are referred to as conditions 1. Under the conditions shown in FIGS. 8 to 10, it is revealed that preferable conditions are Lt=2 mm and L=9 mm. In the following, these conditions are referred to as conditions 2. Under the conditions shown in FIGS. 11 to 13, it is revealed that preferable conditions are Lt=2 mm and L=10 mm. In the following, these conditions are referred to as conditions 3. Under the conditions shown in FIGS. 14 to 16, it is revealed that preferable conditions are Lt=2 mm and L=11 mm. In the following, these conditions are referred to as conditions 4.

Calculated Results of Crosstalk

Figure 17:
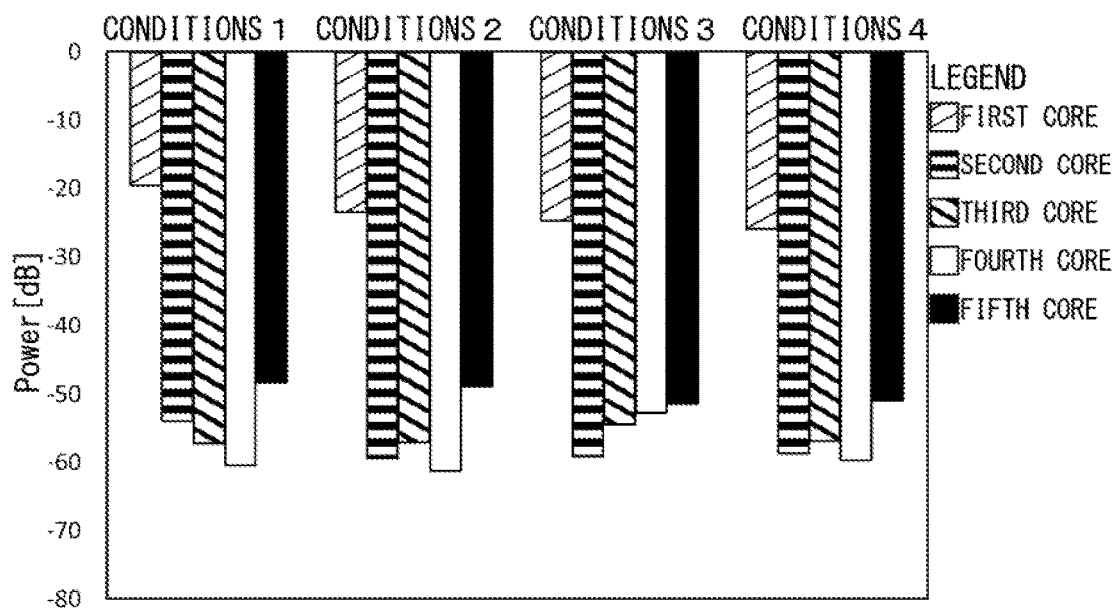
FIG. 17 is a diagram of the emissions [dB] of the first to the fifth cores when the $LP_{01}$ mode light beam is entered to the first core.
Figure 18:
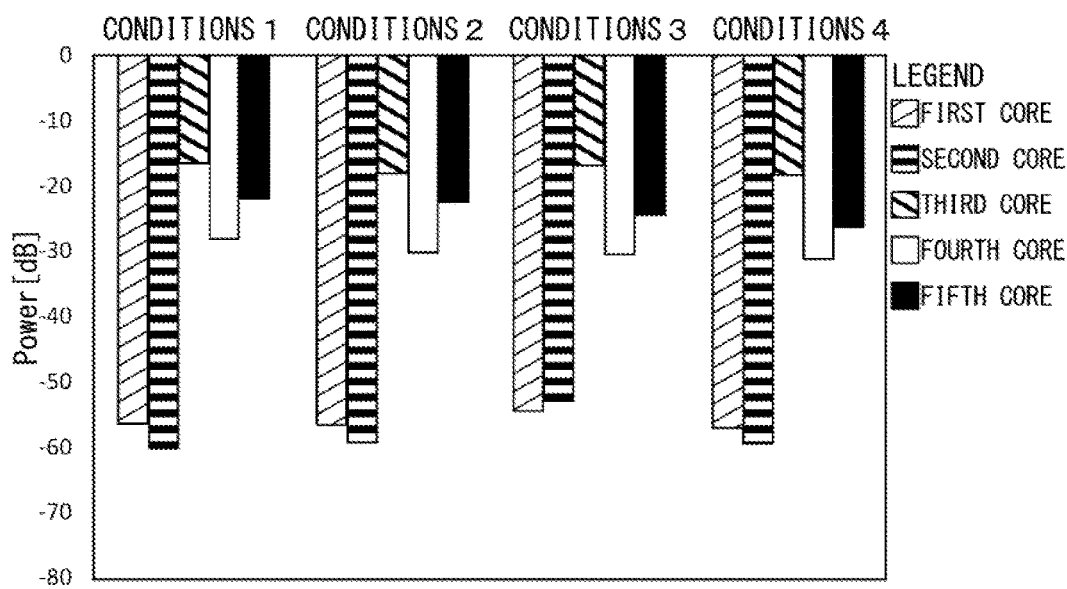
FIG. 18 is a diagram of the emissions [dB] of the first to the fifth cores when the $LP_{01}$ mode light beam is entered to the third core.
Figure 19:
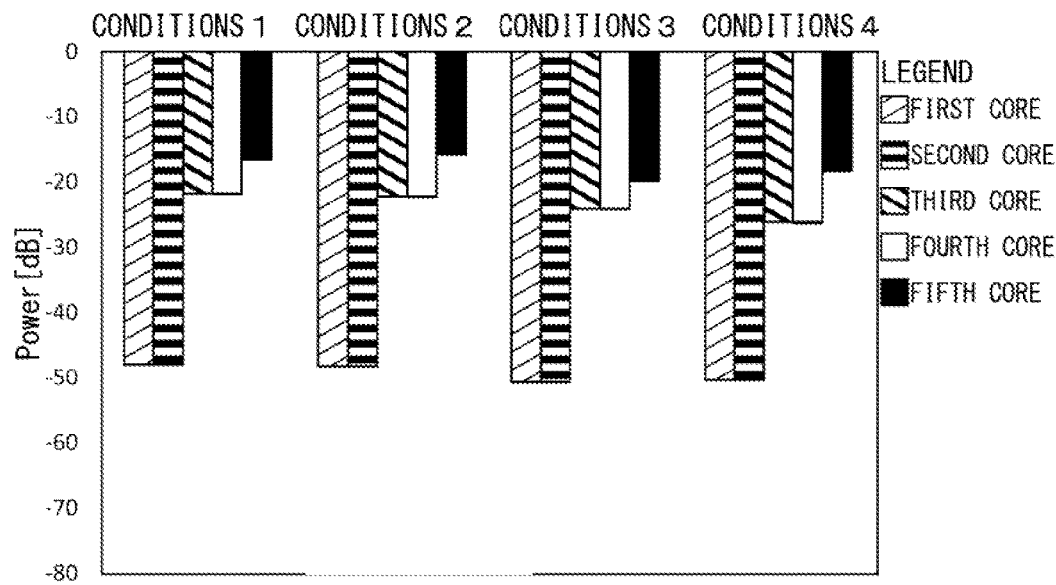
FIG. 19 is a diagram of the emissions [dB] of the first to the fifth cores when the $LP_{01}$ mode light beam is entered to the fifth core.
Figure 20:
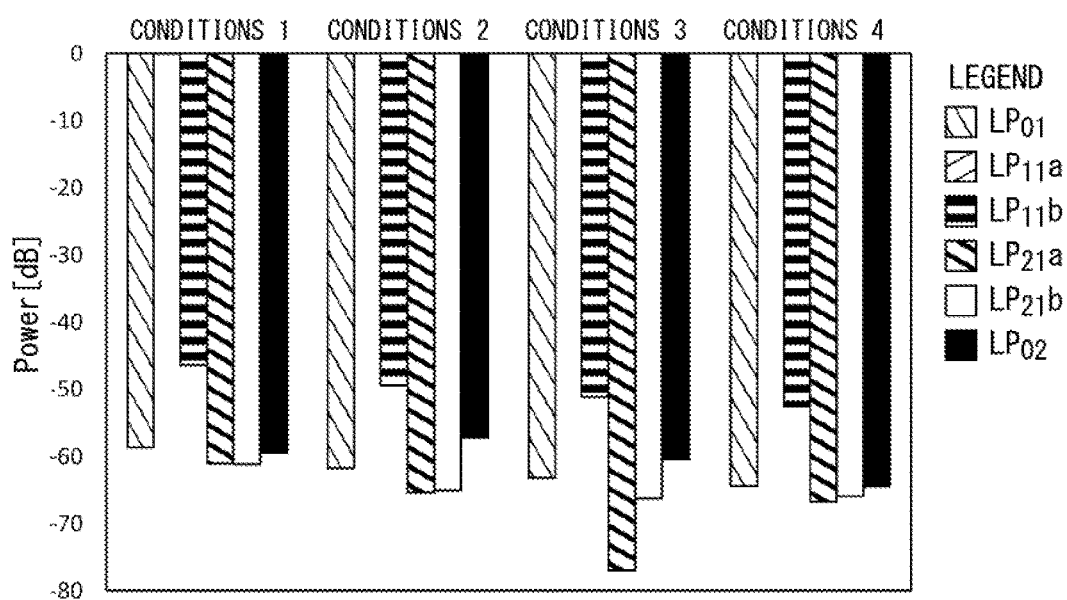
FIG. 20 is a diagram of the emissions of LP mode light beams propagated through the center core when the $LP_{01}$ mode light beam is entered to the first core.
Figure 21:
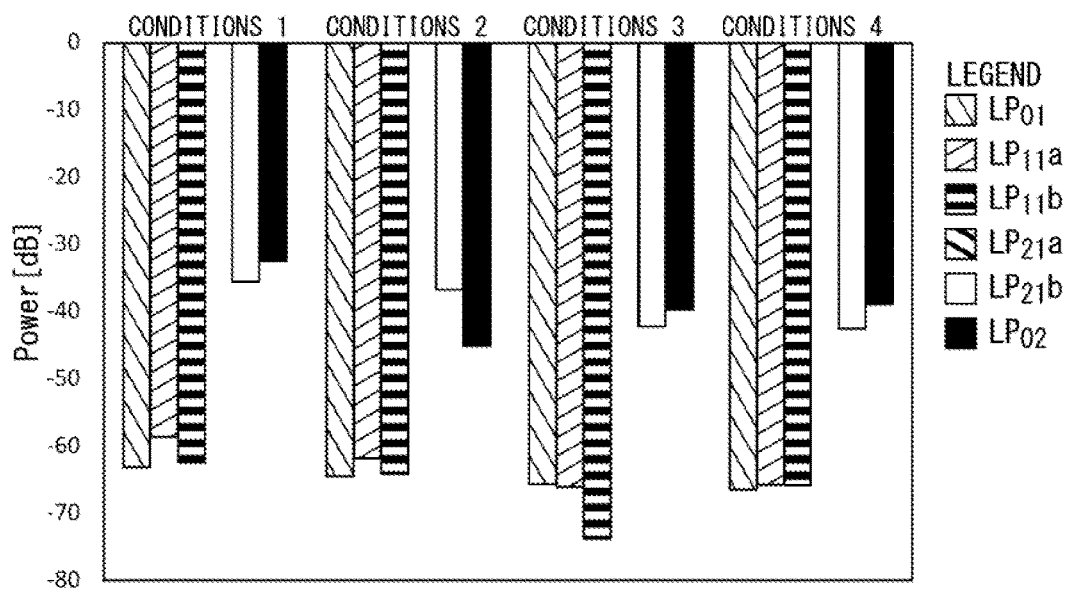
FIG. 21 is a diagram of the emissions of LP mode light beams propagated through the center core when the $LP_{01}$ mode light beam is entered to the third core.
Figure 22:
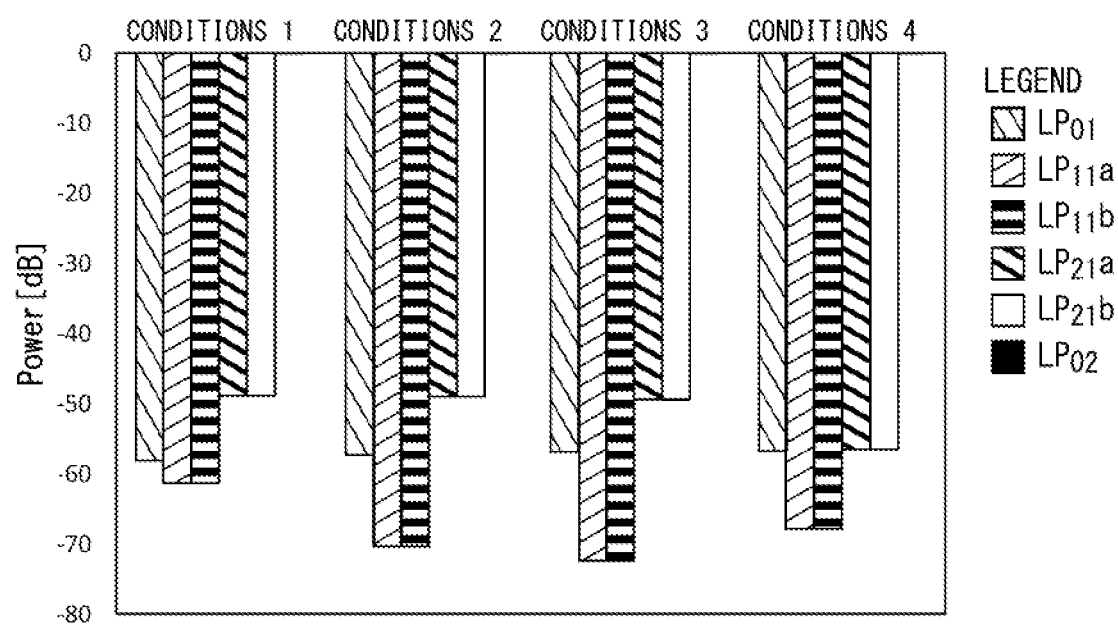
FIG. 22 is a diagram of the emissions of LP mode light beams propagated through the center core when the $LP_{01}$ mode light beam is entered to the fifth core.

FIGS. 17 to 22 show the calculated results of crosstalk. FIG. 17 is a diagram of the emissions [dB] of the first to the fifth cores when the $LP_{01}$ mode light beam was entered to the first core 11. FIG. 18 is a diagram of the emissions [dB] of the first to the fifth cores when the $LP_{01}$ mode light beam is entered to the third core 13. FIG. 19 is a diagram of the emissions [dB] of the first to the fifth cores when the $LP_{01}$ mode light beam was entered to the fifth core 15. FIG. 20 is a diagram of the emissions [dB] of the LP mode light beams propagated through the center core 10 when the $LP_{01}$ mode light beam was entered to the first core 11. FIG. 21 is a diagram of the emissions [dB] of the LP mode light beams propagated through the center core 10 when the $LP_{01}$ mode light beam was entered to the third core 13. FIG. 22 is a diagram of the emissions [dB] of the LP mode light beams propagated through the center core 10 when the $LP_{01}$ mode light beam was entered to the fifth core 15.

FIGS. 17 to 19 show the amount of the light beam remaining in the first to the fifth cores in mode-multiplexing. The amount of the light beam remaining in the cores is preferably small. FIGS. 17 to 19 reveal that in the example, a mode selection ratio of −15 dB was successfully implemented, which is a typical mode selection ratio when a mode-multiplexer/demultiplexer is operated. FIGS. 20 to 22 show constituent ratios in which in the light beams emitted from the center core in mode-multiplexing, what amount of each of the mode light beams is present as crosstalk. Thus, as illustrated in FIG. 20, when the $LP_{01}$ mode light beam is entered to the first core 11, only the $LP_{11}a$ mode light beam is preferably emitted from the center core 10. As illustrated in FIG. 21, when the $LP_{01}$ mode light beam is entered to the third core 13, only the $LP_{21}a$ mode light beam is preferably emitted from the center core 10. As illustrated in FIG. 22, when the $LP_{01}$ mode light beam is entered to the fifth core 15, only the $LP_2$ mode light beam is preferably emitted from the center core 10. In the example shown in FIG. 20, the light beams other than the $LP_{11}a$ mode light beam achieve a crosstalk of −30 dB or less. In the example shown in FIG. 21, the light beams other than the $LP_{21}a$ mode light beam achieve a crosstalk of −30 dB or less. In the example shown in FIG. 22, the light beams other than the $LP_{00}$ mode light beam achieve a crosstalk of −30 dB or less. These results reveal that excellent mode-multiplexing is implemented.

The multicore fiber according to the present invention can mode-multiplex and mode-demultiplex light beams including the $LP_{02}$ mode light beam, and can be used in the industries of optical communications.

The invention claimed is:

1. A multicore fiber comprising:
a center core configured to propagate an $LP_{01}$ mode light beam, an $LP_{11}$ mode light beam, an $LP_{21}$ mode light beam, and an $LP_{02}$ mode light beam;
a first core disposed at a position overlapped with a first line segment extending from a center of the center core in a radial direction;
a second core disposed at a position overlapped with a second line segment extending from the center of the center core in a radial direction at an angle of 90 degrees to the first line segment;
a third core disposed at a position overlapped with a third line segment extending from the center of the center core in a radial direction at an angle of 67.5 degrees to the first line segment and at an angle of 157.5 degrees to the second line segment;
a fourth core disposed at a position overlapped with a fourth line segment extending from the center of the center core in a radial direction at an angle of 67.5 degrees to the second line segment and at an angle of 135 degrees to the third line segment; and
a fifth core disposed at a position overlapped with a fifth line segment extending from the center of the center core in a radial direction at an angle of 67.5 degrees to the third line segment and at an angle of 67.5 degrees to the fourth line segment, wherein
a different mode interaction section and a different mode non-interaction section are provided along a longitudinal direction,
in the different mode interaction section, a propagation constant of the $LP_{11}$ mode light beam propagated through the center core is matched with propagation constants of $LP_{01}$ mode light beams propagated through the first core and the second core such that crosstalk occurs between the $LP_{11}$ mode light beam propagated through the center core and the $LP_{01}$ mode light beams propagated through the first core and the second core, a propagation constant of an $LP_{21}$ mode light beam propagated through the center core is matched with propagation constants of $LP_{01}$ mode light beams propagated through the third core and the fourth core such that crosstalk occurs between the $LP_{21}$ mode light beam propagated through the center core and the $LP_{01}$ mode light beams propagated through the third core and the fourth core, and a propagation constant of an $LP_{02}$ mode light beam propagated through the center core is matched with a propagation constant of an $LP_{01}$ mode light beam propagated through the fifth core such that crosstalk occurs between the $LP_{02}$ mode light beam propagated through the center core and the $LP_{01}$ mode light beam propagated through the fifth core, and in the different mode non-interaction section, propagation constants of the LP mode light beams propagated through the center core are not matched with propagation constants of LP mode light beams propagated through the first core, the second core, the third core, the fourth core, and the fifth core, wherein the first core, the second core, the third core, the fourth core, and the fifth core are separated from one another, from one longitudinal end of the multicore fiber to an opposite longitudinal end of the multicore fiber opposite to the one longitudinal end, and wherein a refractive index of the center core is varied in a radial direction of the center core such that a center part of the center core has a refractive index lower than a refractive index of an outer circumferential part of the center core, the outer circumferential part of the center core being located on an outer circumferential side of the center part in the radial direction.

2. The multicore fiber according to claim 1, wherein an expression below is held, $$g_1, g_2 < g_3, g_4 < g_5$$

where a distance from the center of the center core to a center of the first core is defined as $g_1$, a distance from the center of the center core to a center of the second core is defined as $g_2$, a distance from the center of the center core to a center of the third core is defined as $g_3$, a distance from the center of the center core to a center of the fourth core is defined as $g_4$, and a distance from the center of the center core to a center of the fifth core is defined as $g_5$.

3. The multicore fiber according to claim 1, wherein in the different mode non-interaction section, a distance from the center core to the first core, a distance from the center core to the second core, a distance from the center core to the third core, a distance from the center core to the fourth core, and a distance from the center core to the fifth core are 19 μm or more and 24 μm or less.

4. The multicore fiber according to claim 1, wherein an expression below is held, $$\Delta_c > \Delta_1, \Delta_2 > \Delta_3, \Delta_4 > \Delta_5$$

where a relative refractive index difference of the center core to a cladding is defined as $\Delta_c$, a relative refractive index difference of the first core to the cladding is defined as $\Delta_1$, a relative refractive index difference of the second core to the cladding is defined as $\Delta_2$, a relative refractive index difference of the third core to the cladding is defined as $\Delta_3$, a relative refractive index difference of the fourth core to the cladding is defined as $\Delta_4$, and a relative refractive index difference of the fifth core to the cladding is defined as $\Delta_5$.

5. The multicore fiber according to claim 1, wherein an expression below is held, $$r_c > r_1, r_2 > r_3, r_4 > r_5,$$

where a radius of the center core is defined as $r_c$, a radius of the first core is defined as $r_1$, a radius of the second core is defined as $r_2$, a radius of the third core is defined as $r_3$, a radius of the fourth core is defined as $r_4$, and a radius of the fifth core is defined as $r_5$.

6. The multicore fiber according to claim 1, wherein the different mode interaction section is formed by stretching a part of the different mode non-interaction section.

7. The multicore fiber according to claim 1, wherein the center core is located in a center of the cladding.

8. The multicore fiber according to claim 1, wherein the first core is disposed at a position overlapped with the first line segment extending from the center of the center core in the radial direction in the different mode interaction section and the different mode non-interaction section, the second core is disposed at the position overlapped with the second line segment extending from the center of the center core in the radial direction at an angle of 90 degrees to the first line segment in the different mode interaction section and the different mode non-interaction section, the third core is disposed at the position overlapped with the third line segment extending from the center of the center core in the radial direction at an angle of 67.5 degrees to the first line segment and at an angle of 157.5 degrees to the second line segment in the different mode interaction section and the different mode non-interaction section, the fourth core is disposed at the position overlapped with the fourth line segment extending from the center of the center core in the radial direction at an angle of 67.5 degrees to the second line segment and at an angle of 135 degrees to the third line segment in the different mode interaction section and the different mode non-interaction section, and the fifth core is disposed at the position overlapped with the fifth line segment extending from the center of the center core in the radial direction at an angle of 67.5 degrees to the third line segment and at an angle of 67.5 degrees to the fourth line segment in the different mode interaction section and the different mode non-interaction section.

9. The multicore fiber according to claim 8, wherein the different mode non-interaction section includes a first different mode non-interaction section and a second different mode non-interaction section, and the different mode interaction section is disposed between the first different mode non-interaction section and the second different mode non-interaction section along the longitudinal direction.

10. The multicore fiber according to claim 1, wherein the difference between the propagation constant of the $LP_{21}$ mode light beam and the propagation constant of the $LP_{02}$ mode light beam is increased and inter-modal crosstalk in the center core between the $LP_{21}$ mode light beam and the $LP_{02}$ mode light beam propagated through the center core is suppressed.

* * * * *